(12) United States Patent
Sato

(10) Patent No.: US 9,229,199 B2
(45) Date of Patent: Jan. 5, 2016

(54) ZOOM LENS SYSTEM, IMAGING APPARATUS, AND METHOD FOR MANUFACTURING ZOOM LENS SYSTEM

(75) Inventor: Haruo Sato, Kawaguchi (JP)

(73) Assignee: Nikon Corporation, Tokyo (JP)

( * ) Notice: Subject to any disclaimer, the term of this patent is extended or adjusted under 35 U.S.C. 154(b) by 103 days.

(21) Appl. No.: 14/111,542

(22) PCT Filed: Apr. 2, 2012

(86) PCT No.: PCT/JP2012/058891
§ 371 (c)(1),
(2), (4) Date: Oct. 11, 2013

(87) PCT Pub. No.: WO2012/141023
PCT Pub. Date: Oct. 18, 2012

(65) Prior Publication Data
US 2014/0036376 A1    Feb. 6, 2014

(30) Foreign Application Priority Data

Apr. 12, 2011 (JP) ................................. 2011-088230

(51) Int. Cl.
  *G02B 15/14* (2006.01)
  *G02B 13/04* (2006.01)
  *G02B 15/177* (2006.01)

(52) U.S. Cl.
  CPC .............. *G02B 13/04* (2013.01); *G02B 15/177* (2013.01); *Y10T 29/49826* (2015.01)

(58) Field of Classification Search
  CPC ...... G02B 15/177; G02B 13/04; G02B 15/16; G02B 15/161; G02B 15/163; G02B 15/20; G02B 13/009

USPC .......................................... 359/680, 676, 691
See application file for complete search history.

(56) References Cited

U.S. PATENT DOCUMENTS

| | | | |
|---|---|---|---|
| 4,607,918 A * | 8/1986 | Ogata | 359/681 |
| 4,726,666 A | 2/1988 | Ota et al. | |
| 4,889,416 A * | 12/1989 | Yamada | 359/676 |

FOREIGN PATENT DOCUMENTS

| | | |
|---|---|---|
| JP | 59-142514 A | 8/1984 |
| JP | 61-087117 A | 5/1986 |

(Continued)

OTHER PUBLICATIONS

English translation of International Preliminary Report on Patentability from International Patent Application No. PCT/JP2012/058891, transmitted Oct. 24, 2013.

(Continued)

*Primary Examiner* — Darryl J Collins
*Assistant Examiner* — Kristina Deherrera
(74) *Attorney, Agent, or Firm* — Miles & Stockbridge P.C.

(57) ABSTRACT

A zoom lens system includes, in order from an object, a front group G1 having negative refractive power, a rear group G2 having positive refractive power, zooming being conducted by varying a distance between the front group G1 and the rear group G2, the front group G1 including at least a negative lens and a positive lens, and the rear group G2 including, in order from an object side, a first partial group LA having positive refractive power, a second partial group LB having negative refractive power, a third partial group LC having positive refractive power and a negative lens LD, and predetermined conditions being satisfied, thereby providing a zoom lens system which is compact in size, and has small back focus and excellent optical property.

23 Claims, 14 Drawing Sheets

(56) References Cited

FOREIGN PATENT DOCUMENTS

| | | |
|---|---|---|
| JP | 63-032512 A | 2/1988 |
| JP | 2001-330773 A | 11/2001 |
| JP | 2002-082283 A | 3/2002 |

OTHER PUBLICATIONS

International Search Report from International Patent Application No. PCT/JP2012/058891, May 15, 2012.

* cited by examiner

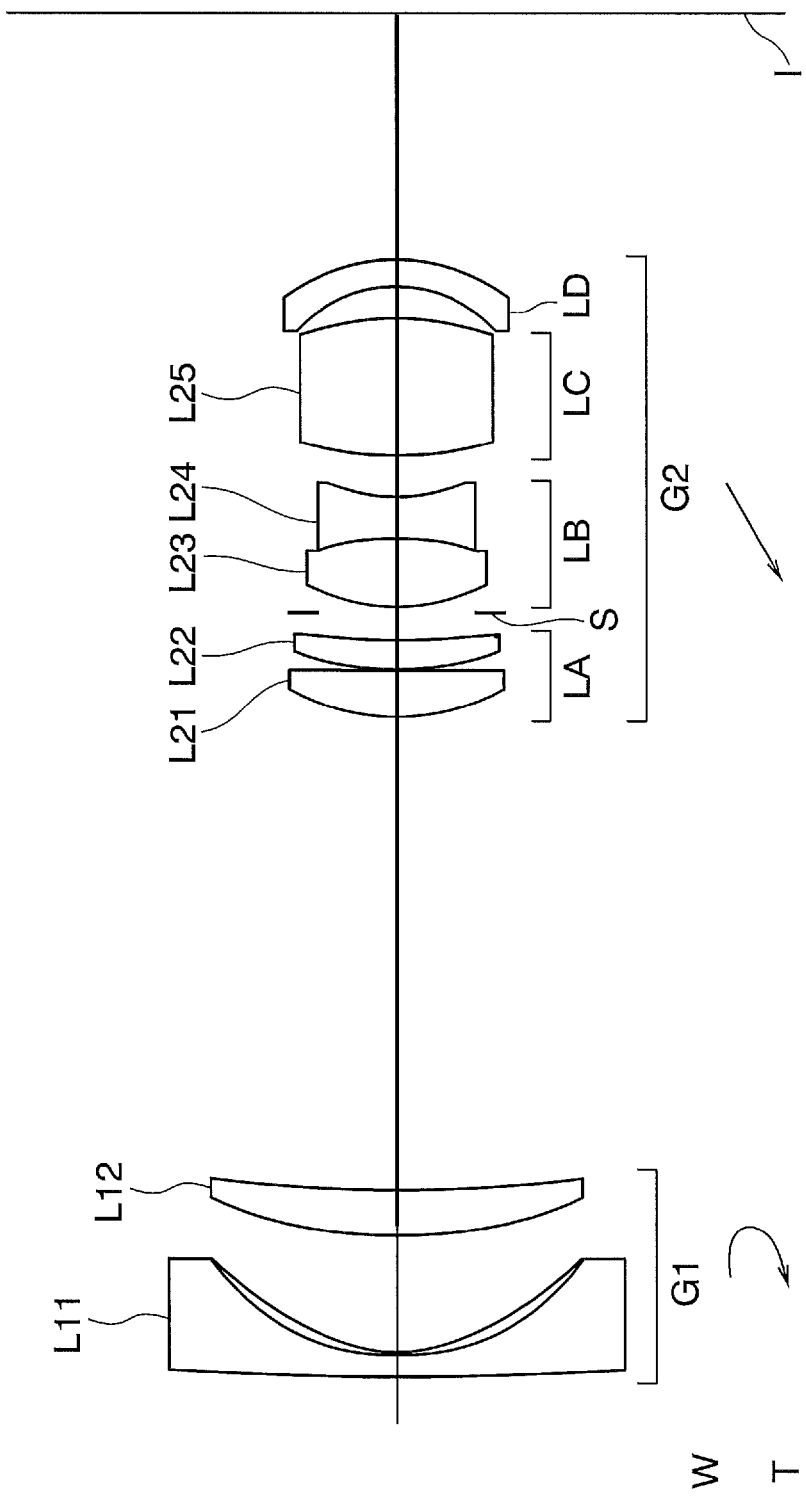

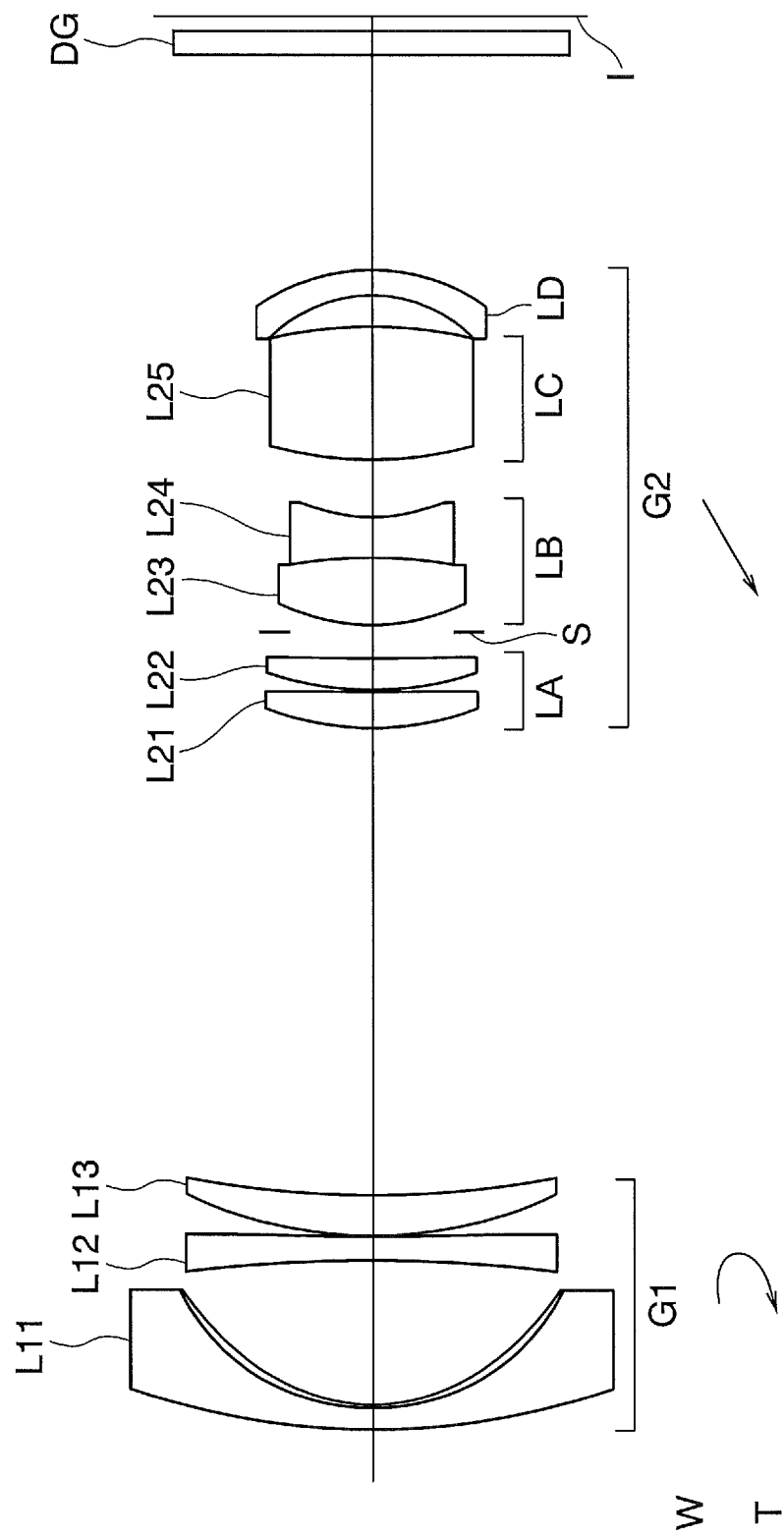

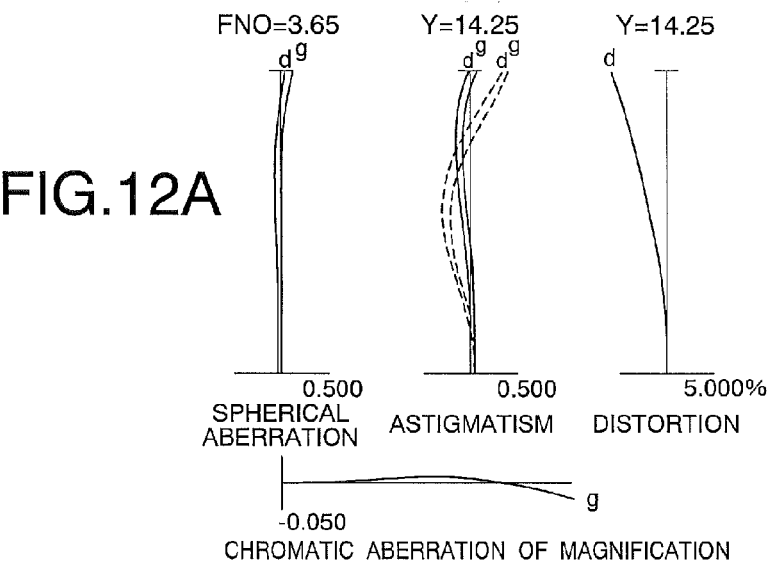
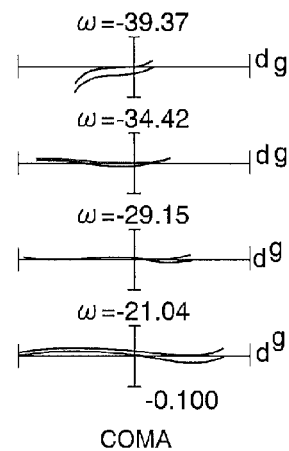
FIG.12A
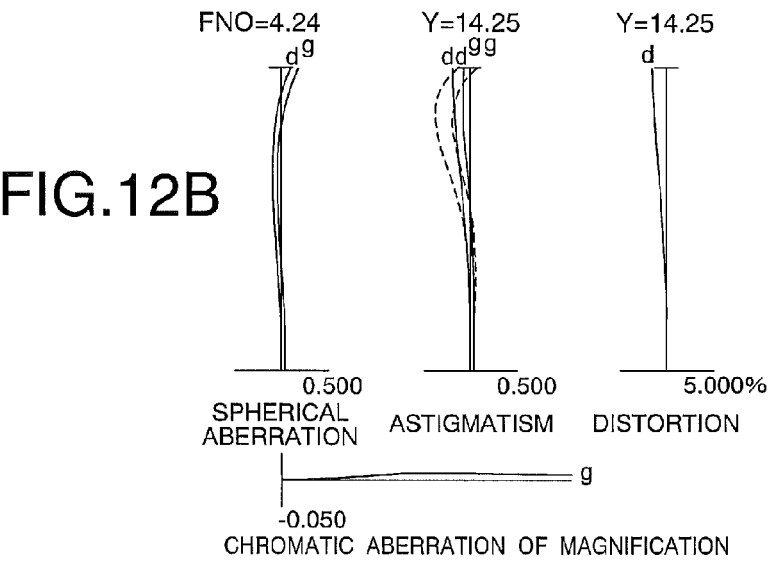
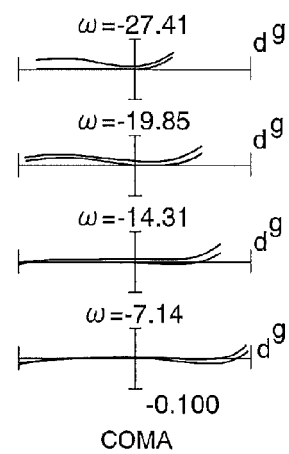
FIG.12B
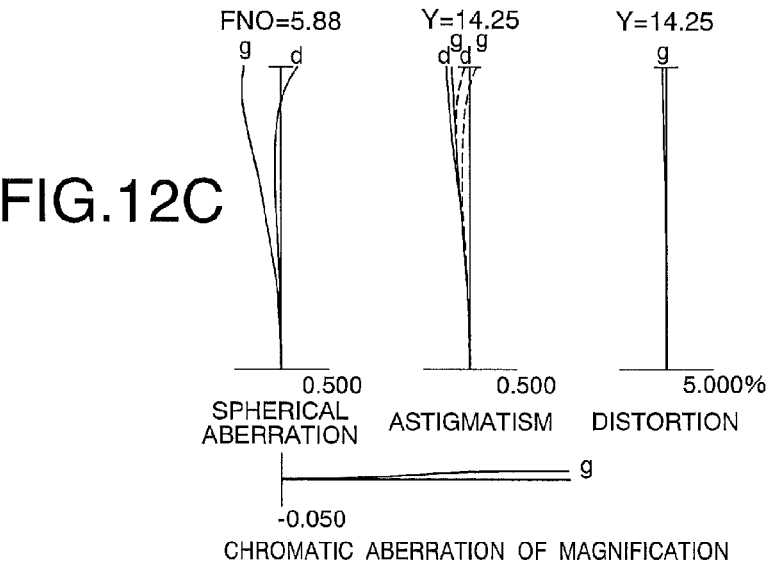
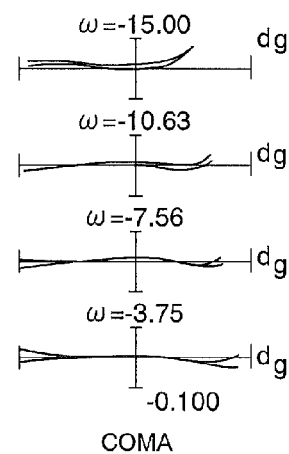
FIG.12C

ZOOM LENS SYSTEM, IMAGING APPARATUS, AND METHOD FOR MANUFACTURING ZOOM LENS SYSTEM

TECHNICAL FIELD

The present invention relates to a zoom lens system that is suitable for a phototaking optical system used in a digital camera, a film camera, a video camera or the like, an imaging apparatus, and a method for manufacturing the zoom lens system.

BACKGROUND ART

There has been proposed a zoom lens system that is compact in size and is composed of less number of constituent lenses (for example, refer to Japanese Patent Application Laid-Open No. 2001-330773).

SUMMARY OF THE INVENTION

The Problems to be Solved by the Invention

However, the conventional zoom lens system as abovementioned has not been made satisfactorily compact in size. For such a reason, a zoom lens of a type that is intended to be compact in size but also advantageous for correcting astigmatism, curvature of field, coma and spherical aberration, has been sought to be attained.

Means for Solving the Problems

The present invention is made in view of the above described problems and has an object to provide a zoom lens system which is compact in size and has small back focus and excellent optical performance, an imaging apparatus, and a method for manufacturing the zoom lens system.

According to a first aspect of the present invention, to solve the above described problems, there is provided a zoom lens system comprising, in order from an object side: a front group having negative refractive power; and a rear group having positive refractive power;
zooming being carried out by varying a distance between said front group and said rear group;
said front group having, at least, a negative lens and a positive lens;
said rear group having, in order from the object side, a first partial group having a positive refractive power, a second partial group having a negative refractive power, a third partial group having a positive refractive power, and a negative lens; and
the following conditional expressions being satisfied:

$$0.00 < (r2-r1)/(r2+r1) < 1.00$$

$$0.10 < BFw/fw < 2.00$$

$$0.90 < f2/fw < 5.00$$

where r1 denotes a curvature radius of an object side lens surface of said negative lens in said rear group,
r2 denotes a curvature radius of an image side lens surface of said negative lens in said rear group,
fw denotes a focal length of the entire zoom lens system upon focusing on an infinitely distant object in the wide-angle end state,
BFw denotes a back focus of the entire zoom lens system upon focusing on the infinitely distant object in the wide-angle end state, and
f2 denotes a focal length of said rear group.

According to a second aspect of the present invention, there is provided an imaging apparatus equipped with the zoom lens system relating to the first aspect of the present invention.

According to a third aspect of the present invention, there is provided a method for manufacturing a zoom lens system comprising, in order from an object side: a front group having a negative refractive power, and a rear group having a positive refractive power, comprising steps of:
constructing said front group to include, at least, a negative lens and a positive lens;
constructing said rear group to include, in order from the object side, a first partial group having positive refractive power, a second partial group having negative refractive power, a third partial group having positive refractive power, and a negative lens;
arranging said front group and said rear group such that the following conditional expressions may be satisfied:

$$0.00 < (r2-r1)/(r2+r1) < 1.00$$

$$0.10 < BFw/fw < 2.00$$

$$0.90 < f2/fw < 5.00$$

where r1 denotes a curvature radius of an object side lens surface of said negative lens in said rear group,
r2 denotes a curvature radius of an image side lens surface of said negative lens in said rear group,
fw denotes a focal length of the entire zoom lens system upon focusing on an infinitely distant object in the wide-angle end state,
BFw denotes a back focus of the entire zoom lens system upon focusing on the infinitely distant object in the wide-angle end state, and
f2 denotes a focal length of said rear group; and
constructing said front group and said rear group so that a distance therebetween may be varied for zooming.

Effect of the Invention

According to the present invention, there are provided a zoom lens system that is compact in size and has a small back focus and excellent optical performance, an imaging apparatus and a method for manufacturing the zoom lens system.

BRIEF DESCRIPTION OF THE DRAWINGS

FIG. 1 is a sectional view showing a lens configuration of a zoom lens system according to Example 1 of the present application.

FIG. 3 is a sectional view showing a lens configuration of a zoom lens system according to Example 2 of the present application.

FIGS. 12A, 12B and 12C are graphs, respectively, showing various aberrations upon focusing on an infinitely distant object in the wide-angle end state, in an intermediate focal length state and in the telephoto end state of the zoom lens system according to the Example 6 of the present application.

EMBODIMENTS FOR CARRYING OUT THE INVENTION

Figure 2A:
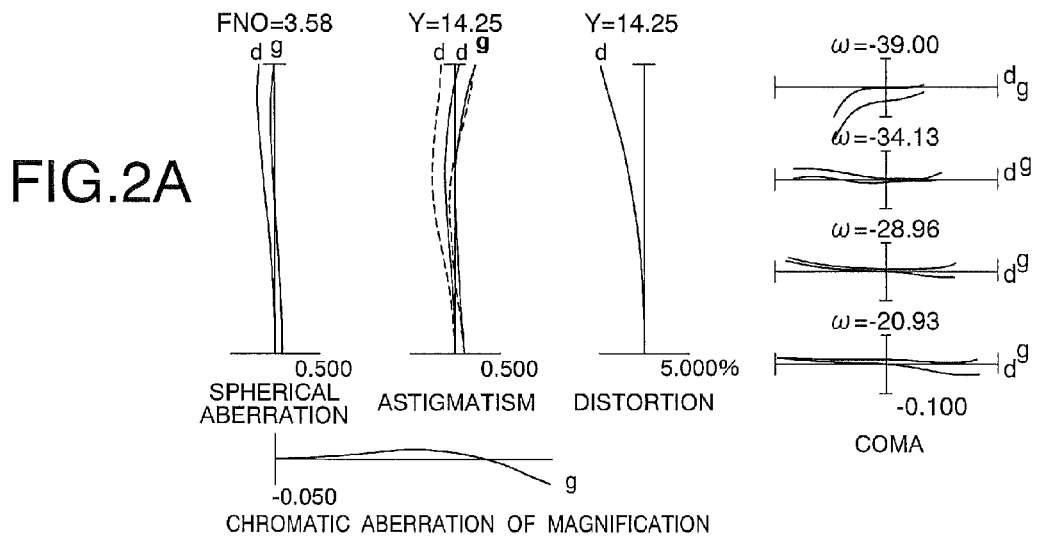
FIGS. 2A, 2B and 2C are graphs, respectively, showing various aberrations upon focusing on an infinitely distant object in the wide-angle end state, in an intermediate focal length state and in the telephoto end state of the zoom lens system according to Example 1 of the present application.

A zoom lens system, an imaging apparatus, and a method for manufacturing the zoom lens system according to the present application are explained below.

A zoom lens system according to the present application includes, in order from an object side, a front group having a negative refractive power, and a rear group having a positive refractive power;

zooming being carried out by varying a distance between said front group and said rear group;

said front group having, at least, a negative lens and a positive lens;

said rear group having, in order from the object side, a first partial group having a positive refractive power, a second partial group having a negative refractive power, a third partial group having a positive refractive power, and a negative lens; and the following conditional expressions (1) to (3) being satisfied:

$$0.00 < (r2-r1)/(r2+r1) < 1.00 \quad (1)$$

$$0.10 < BFw/fw < 2.00 \quad (2)$$

$$0.90 < f2/fw < 5.00 \quad (3)$$

where r1 denotes a curvature radius of an object side lens surface of said negative lens in said rear group, r2 denotes a curvature radius of an image side lens surface of said negative lens in said rear group, fw denotes a focal length of the entire zoom lens system upon focusing on an infinitely distant object in the wide-angle end state, and BFw denotes a back focus of the entire zoom lens system upon focusing on the infinitely distant object in the wide-angle end state (meanwhile, in the cases where an optical low pass filter or alternative optical filter is disposed between the most image side lens and the image plane in said zoom lens system, the optical low pass filer or the alternative optical filter is removed to measure back focus, that is, air converted value of the back focus is calculated), and f2 denotes a focal length of said rear group.

Generally, in a zoom lens system composed of a front group and a rear group, a configuration of the rear group that is a master lens group covering focal length range from a wide-angle range to a standard range, and further to a telephoto range, is mainly of modified triplet type or an Ernostar type whose basic structure is composed of positive-positive-negative-positive four partial groups from the object side in this order, due to relation between the principal point and the back focus. However, in recent years, a mirror-less type digital camera has been developed, and a zoom lens system which has small back focus, and sufficient distance between the exit pupil and the image plane, and further which is compact in size and composed of less number of lenses, has been desired.

Accordingly, in the zoom lens system of the present application, the rear group is so configured to have positive-negative-positive-negative four partial groups from the object side in this order. By such configuration, back focus may be made small, a distance between the exit pupil and the image plane may be held satisfactorily, the number of lenses may be reduced and the system may be made compact. Further, spherical aberration, coma, curvature radius and astigmatism may be well corrected, and excellent optical performance may be achieved.

Conditional expression (1) defines inverse of shape factor (q-factor) of the negative lens in the rear group of the zoom lens system of the present application. If the value of 1/q becomes close to 0.00, that negative lens has a meniscus-shape in which curvature radius of the object side lens surface is extremely close to that of the image side lens surface.

On the other hand, the value of 1/q changes to 1.00, it means that that negative lens changes to a double concave negative lens from a plano-concave lens that has a concave surface facing to the object side. By satisfying the conditional expression (1), the zoom lens system of the present application can set a distance between the exit pupil and the image plane and the back focus to optimum values, and also various aberrations can be corrected well.

When the value of (r2−r1)/(r2+r1) is equal to or exceeds the upper limit value of the conditional expression (1), the negative lens included in the rear group, as described herein above, becomes a double concave negative lens. In this case, it is not possible to set the distance between the exit pupil and the image plane and the back focus to the respective optimum values so that it becomes not possible to attain the object of the present application. Moreover, regarding corrections of aberrations, in particular, curvature of field, astigmatism and coma in the wide angle end state would be deteriorated, so it is not desirable.

In order to secure the effect of the present application more surely, it is more preferable to replace the upper limit value of the conditional expression (1) by 0.80, thereby various aberrations being corrected more surely. Furthermore, in order to secure the effect of the present application more surely, it is more preferable to replace the upper limit value of the conditional expression (1) by 0.70. Moreover, in order to attain the effect of the present application more surely, it is more preferable to replace the upper limit value of the conditional expression (1) by 0.60. Moreover, in order to attain the effect of the present application more surely, it is more preferable to replace the upper limit value of the conditional expression (1) by 0.30. Furthermore, in order to attaining the maximum effect of the present application, it is more preferable to replace the upper limit value of the conditional expression (1) by 0.28.

On the other hand, when the value of (r2−r1)/(r2+r1) is equal to or falls below the lower limit value of conditional expression (1), the refractive power of the negative lens in the rear lens group becomes outstandingly small, and it becomes difficult to correct aberrations. In particular, coma, curvature of field, astigmatism and spherical aberration in the telephoto end state would be deteriorated, so it is not desirable.

In order to make the effects of the present application more certain, it is more preferable to replace the lower limit of the conditional expression (1) by 0.01, and thereby various aberrations is able to be corrected more excellently. Further, in order to make the effects of the present application still more certain, it is more preferable to replace the lower limit of the conditional expression (1) by 0.03. Furthermore, in order to make the effects of the present application more certain, it is more preferable to replace the lower limit of the conditional expression (1) by 0.05. Moreover, in order to attain the effects of the present application at maximum, it is more preferable to replace the lower limit of the conditional expression (1) by 0.08.

Conditional expression (2) defines the back focus of the zoom lens system according to the present application. With satisfying the conditional expression (2), it is possible to set a distance between the exit pupil and the image plane and the back focus of the zoom lens system of the present application to most proper values, and further various aberrations can be corrected satisfactorily.

When the value of BFw/fw is equal to or exceeds the upper limit of the conditional expression (2), the back focus becomes large. This is against downsizing the zoom lens system of the present application, so this is not preferable. Moreover, this causes deteriorations in spherical aberration in the telephoto end state and coma in the wide-angle end state, so this is not preferable.

In order to make the effects of the present application more certain, it is more preferable to replace the upper limit of the conditional expression (2) by 1.80. Further, in order to make the effects of the present application still more certain, it is more preferable to replace the upper limit of the conditional expression (2) by 1.50. Furthermore, in order to make the effects of the present application more certain, it is preferable to replace the upper limit of the conditional expression (2) by 1.40. Furthermore, in order to attain the effects of the present application at maximum, it is preferable to replace the upper limit of the conditional expression (2) by 1.20.

On the other hand, when the value of BFw/fw is equal to or falls below the lower limit of the conditional expression (2), the back focus becomes outstandingly small and a distance between the exit pupil and the image plane becomes small. This is not preferable in the case where the zoom lens system of the present application is used for a digital camera. This causes deteriorations in curvature of field, astigmatism and coma in the wide angle end state, so this is not preferable.

In order to make the effects of the present application more certain, it is preferable to replace the lower limit of the conditional expression (2) by 0.40, and thereby it is possible to correct various aberrations more satisfactorily. Further, in order to make the effects of the present application still more certain, it is more preferable to replace the lower limit of the conditional expression (2) by 0.50. Further, in order to make the effects of the present application still more certain, it is more preferable to replace the lower limit of the conditional expression (2) by 0.80. Furthermore, in order to attain the effects of the present application at maximum, it is most preferable to replace the lower limit of the conditional expression (2) by 0.84.

Conditional expression (3) defines a focal length of the rear group, in other words, is for setting the refractive power of the rear group. With satisfying the conditional expression (3), the zoom lens system according to the present application can set the refractive power of the rear group properly, so that various aberrations may be corrected well without making the zoom lens system of the present application large in size.

When the value of f2/fw is equal to or exceeds the upper limit of the conditional expression (3), the focal length of the rear group becomes large, which means that the refractive power of the rear group becomes small. In this case, the zoom lens system of the present application becomes large in size, so this is not desirable. Further, with respect to corrections of aberrations, this causes deteriorations in coma, so this is not preferable.

In order to make the effects of the present application more certain, it is preferable to replace the upper limit of the conditional expression (3) by 4.00, which is advantageous for correcting various aberrations. Further, in order to make the effects of the present application still more certain, it is more preferable to replace the upper limit of the conditional expression (3) by 3.50. Still further, in order to make the effects of the present application still more certain, it is still more preferable to replace the upper limit of the conditional expression (3) by 3.00. Still further, in order to make the effects of the present application further more certain, it is further more preferable to replace the upper limit of the conditional expression (3) by 2.50. Further, in order to attain the effects of the present application at maximum, it is preferable to replace the upper limit of the conditional expression (3) by 2.00.

On the other hand, when the value of f2/fw is equal to or falls below the lower limit of the conditional expression (3), the focal length of the rear group becomes small. This means that refractive power of the rear group becomes large. In this case, in particular, coma, curvature of field, astigmatism and spherical aberration in the telephoto end state are deteriorated, so this is not preferable.

In order to make the effects of the present application more certain, it is preferable to replace the lower limit of the conditional expression (3) by 1.00, and thereby it is advantageous to correct various aberrations such as spherical aberration more satisfactorily. Further, in order to make the effects of the present application still more certain, it is more preferable to replace the lower limit of the conditional expression (3) by 1.20. Further, in order to make the effects of the present application still more certain, it is more preferable to replace the lower limit of the conditional expression (3) by 1.25. Furthermore, in order to attain the effects of the present application at maximum, it is most preferable to replace the lower limit of the conditional expression (3) by 1.30.

It is preferable that, in the zoom lens system of the present application, said third partial group in said rear group consists of a single positive lens or two lenses. By this configuration, the zoom lens system of the present application can correct spherical aberration well.

It is preferable that, in the zoom lens system of the present application, said third partial group in said rear group consists of two lenses which are cemented together. By this configuration, that is, by configuring said third partial group with the cemented positive lens only, it becomes possible to correct spherical aberration and chromatic aberration well.

It is preferable that, in the zoom lens system of the present application, said first partial group in said rear group consists of a single positive lens or two positive lenses. By this configuration, the zoom lens system of the present application can correct spherical aberration in the telephoto end state well.

It is preferable that, in the zoom lens system of the present application, said second partial group in said rear group consists of a single negative lens or two lenses. By this configuration, it is possible for the zoom lens system of the present application to correct axial chromatic aberration and spherical aberration well.

It is preferable that the zoom lens system of the present application satisfies the following conditional expression (4):

$$0.10 < (-fd)/f2 < 6.00 \qquad (4),$$

where fd denotes the focal length of said negative lens in said rear group; and
f2 denotes the focal length of said rear group.

Conditional expression (4) defines the focal length of the negative lens in the rear group, in other words, defines the refractive power of that negative lens. With satisfying the conditional expression (4), the zoom lens system according to the present application can set the refractive power of the negative lens in the rear group properly, and the distance between the exit pupil and the image plane and the back focus can be set to the respective optimum values, and also various aberrations can be corrected satisfactorily.

When the value of (-fd)/f2 is equal to or exceeds the upper limit of the conditional expression (4), the absolute value of the focal length of the negative lens in the rear group becomes large, which means that the refractive power of the negative lens becomes small. For this reason, it becomes not possible to set the distance between the exit pupil and the image plane and the back focus to the optimal values. Moreover, regarding corrections of aberrations, the negative lens in the rear group is deteriorated in an ability for correcting aberrations and it becomes not possible to correct coma sufficiently.

In order to make the effects of the present application more certain, it is preferable to replace the upper limit of the conditional expression (4) by 5.70, and thereby it is advantageous to correct various aberrations. Further, in order to make the effects of the present application still more certain, it is more preferable to replace the upper limit of the conditional expression (4) by 5.50. Still further, in order to make the effects of the present application still more certain, it is more preferable to replace the upper limit of the conditional expression (4) by 5.00. Furthermore, in order to attain the effects of the present application at maximum, it is most preferable to replace the upper limit of the conditional expression (4) by 4.60.

On the other hand, when the value of (-fd)/f2 is equal to or falls below the lower limit of the conditional expression (4), the absolute value of the focal length of the negative lens in the rear group becomes small. This means that the refractive power of the negative lens in the rear group becomes large. For this, the back focus becomes too small, and moreover the exit pupil becomes too close to the image plane. Further, regarding corrections of aberrations, coma, curvature of field and astigmatism are deteriorated, so this is not preferable.

In order to make the effects of the present application more certain, it is more preferable to replace the lower limit of the conditional expression (4) by 0.30, and thereby it is possible to correct various aberrations satisfactorily. Further, in order to make the effects of the present application still more certain, it is more preferable to replace the lower limit of the conditional expression (4) by 0.80. Further, in order to make the effects of the present application still more certain, it is more preferable to replace the lower limit of the conditional expression (4) by 1.00. Furthermore, in order to attain the effects of the present application at maximum, it is most preferable to replace the lower limit of the conditional expression (4) by 1.15.

Further, it is preferable that the zoom lens system of the present application satisfies the following conditional expression (5):

$$0.10 < fc/f2 < 3.00 \qquad (5),$$

where fc denotes the focal length of said third partial group in said rear group; and
f2 denote the focal length of said rear group.

Conditional expression (5) defines the focal length of the third partial group in the rear group, in other words, defines the refractive power of the third partial group. With satisfying the conditional expression (5), the zoom lens system according to the present application can set the refractive power of the third partial group properly, so that various aberrations can be corrected satisfactorily.

When the value of fc/f2 is equal to or exceeds the upper limit of the conditional expression (5), the focal length of the third partial group becomes large, which means that the positive refractive power of the third partial group becomes small. For this reason, it becomes not possible to set the Petzval sum to the optimal value. As a result, astigmatism and curvature of field are deteriorated. This is not preferable.

In order to make the effects of the present application more certain, it is preferable to replace the upper limit of the conditional expression (5) by 2.50, and thereby it is advantageous to correct various aberrations. Further, in order to make the effects of the present application still more certain, it is more preferable to replace the upper limit of the conditional expression (5) by 2.00. Furthermore, in order to make the effects of the present application still more certain, it is more preferable to replace the upper limit of the conditional expression (5) by 1.20. Furthermore, in order to attain the effects of the present application at maximum, it is most preferable to replace the upper limit of the conditional expression (5) by 1.10.

On the other hand, when the value of fc/f2 is equal to or falls below the lower limit of the conditional expression (5), the focal length of the third partial group becomes small, which means that the positive refractive power of the third partial group becomes large. In this case, in particular, longitudinal chromatic aberration, coma, spherical aberration in the telephoto end state, are deteriorated, so this is not preferable.

In order to make the effects of the present application more certain, it is preferable to replace the lower limit of the conditional expression (5) by 0.20, and thereby it is possible to correct various aberrations satisfactorily. Further, in order to make the effects of the present application still more certain, it is more preferable to replace the lower limit of the conditional expression (5) by 0.30. Further, in order to make the effects of the present application still more certain, it is more preferable to replace the lower limit of the conditional expression (5) by 0.40. Furthermore, in order to attain the effects of the present application at maximum, it is most preferable to replace the lower limit of the conditional expression (5) by 0.60.

Further, it is preferable that the zoom lens system of the present application satisfies the following conditional expression (6):

$$0.01 < fa/f2 < 3.00 \qquad (6),$$

where fa denotes the focal length of said first partial group in said rear group; and f2 denote the focal length of said rear group.

Conditional expression (6) defines the focal length of the first partial group in the rear group, in other words, defines the refractive power of the first partial group. With satisfying the conditional expression (6), the zoom lens system according to the present application can set the refractive power of the first partial group properly, so that various aberrations can be corrected satisfactorily.

When the value of fa/f2 is equal to or exceeds the upper limit of the conditional expression (6), the focal length of the first partial group becomes large, that is to say, the positive refractive power of the first partial group becomes small. For this reason, it is not possible to set the Petzval sum to the optimal value. As a result, astigmatism and curvature of field are deteriorated. This is not preferable.

In order to make the effects of the present application more certain, it is preferable to replace the upper limit of the conditional expression (6) by 2.50, and thereby it is advantageous to correct various aberrations. Further, in order to make the effects of the present application still more certain, it is more preferable to replace the upper limit of the conditional expression (6) by 2.00. Furthermore, in order to make the effects of the present application still more certain, it is more preferable to replace the upper limit of the conditional expression (6) by 1.50. Furthermore, in order to attain the effects of the present application at maximum, it is most preferable to replace the upper limit of the conditional expression (6) by 1.00.

On the other hand, when the value of fa/f2 is equal to or falls below the lower limit of the conditional expression (6), the focal length of the first partial group becomes small, that is to say, the positive refractive power of the first partial group becomes large. In this case, in particular, coma and spherical aberration in the telephoto end state are deteriorated, so this is not preferable.

In order to make the effects of the present application more certain, it is more preferable to replace the lower limit of the conditional expression (6) by 0.05, and thereby it is possible to correct various aberrations satisfactorily. Further, in order to make the effects of the present application still more certain, it is more preferable to replace the lower limit of the conditional expression (6) by 0.10. Further, in order to make the effects of the present application still more certain, it is more preferable to replace the lower limit of the conditional expression (6) by 0.11. Furthermore, in order to attain the effects of the present application at maximum, it is more preferable to replace the lower limit of the conditional expression (6) by 0.12.

It is preferable that the zoom lens system of the present application satisfies the following conditional expression (7):

$$0.10 < (-fb)/f2 < 4.00 \quad (7),$$

where fb denotes the focal length of said second partial group in said rear group; and f2 denote the focal length of said rear group.

Conditional expression (7) defines the focal length of the second partial group in said rear group, in other words, defines the refractive power of that second partial group. With satisfying the conditional expression (7), the zoom lens system according to the present application can set the refractive power of the second partial group properly, so that various aberrations can be corrected satisfactorily.

When the value of (-fb)/f2 is equal to or exceeds the upper limit of the conditional expression (7), the absolute value of the focal length of the second partial group becomes large, which means that the negative refractive power of the second partial group becomes small. For this reason, it becomes not possible to set the Petzval sum to the optimal value. As a result, astigmatism and curvature of field are deteriorated, so this is not desirable.

In order to make the effects of the present application more certain, it is more preferable to replace the upper limit of the conditional expression (7) by 3.50, and thereby it is advantageous for correcting various aberrations. Further, in order to make the effects of the present application still more certain, it is more preferable to replace the upper limit of the conditional expression (7) by 3.00. Further, in order to make the effects of the present application still more certain, it is more preferable to replace the upper limit of the conditional expression (7) by 2.50. Furthermore, in order to attain the effects of the present application at maximum, it is more preferable to replace the upper limit of the conditional expression (7) by 2.40.

On the other hand, when the value of (-fb)/f2 is equal to or falls below the lower limit of the conditional expression (7), the absolute value of the focal length of the second partial group becomes small. This means that the negative refractive power of the second partial group becomes large. In this case, in particular, longitudinal chromatic aberration, coma, and spherical aberration in the telephoto end state, are deteriorated, so this is not preferable.

In order to make the effects of the present application more certain, it is more preferable to replace the lower limit of the conditional expression (7) by 0.20, and thereby it is possible to correct various aberrations satisfactorily. Further, in order to make the effects of the present application still more certain, it is more preferable to replace the lower limit of the conditional expression (7) by 0.40. Further, in order to make the effects of the present application still more certain, it is more preferable to replace the lower limit of the conditional expression (7) by 0.50. Furthermore, in order to attain the effects of the present application at maximum, it is more preferable to replace the lower limit of the conditional expression (7) by 0.60.

Further, it is preferable that the zoom lens system of the present application includes an aperture stop between said first partial group and said second partial group. By such a configuration, it is possible for the zoom lens system of the present application to correct astigmatism and distortion satisfactorily.

The imaging apparatus of the present application is characterized in the provision of the zoom lens system having a configuration as described above. By such a configuration, it is possible to realize an imaging apparatus that is compact in size and has small back focus and excellent optical performance.

The method for manufacturing a zoom lens system according to the present application is a method for manufacturing a zoom lens system which includes, in order from an object side, a front group having negative refractive power, and a rear group having positive refractive power, the method comprising steps of:

constructing said front group with at least a negative lens and a positive lens;

constructing said rear group with, in order from the object side, a first partial group having positive refractive power, a second partial group having negative refractive power, a third partial group having positive refractive power and a negative lens;

arranging said front group and said rear group so that said front group and said rear group may satisfy the following conditional expressions (1) to (3):

$$0.00<(r2-r1)/(r2+r1)<1.00 \quad (1)$$

$$0.10<BFw/fw<2.00 \quad (2)$$

$$0.90<f2/fw<5.00 \quad (3)$$

where r1 denotes a curvature radius of an object side lens surface of said negative lens in said rear group, r2 denotes a curvature radius of an image side lens surface of said negative lens in said rear group, fw denotes a focal length of the entire zoom lens system upon focusing on an infinitely distant object in the wide-angle end state, BFw denotes a back focus of the entire zoom lens system upon focusing on the infinitely distant object in the wide-angle end state; and f2 denotes a focal length of said rear lens group; and constructing said front group and said rear group such that a distance therebetween may be varied for zooming.

According to the method for manufacturing a zoom lens system of the present application, a zoom lens system that is compact in size and has small back focus and excellent optical performance may be manufactured.

Zoom lens systems relating to the numerical examples according to the present application are explained below with reference to accompanying drawings.

Example 1

FIG. 1 is a sectional view showing a lens configuration of a zoom lens system and a zoom trajectory thereof according to Example 1 of the present application.

The zoom lens system according to Example 1 is composed of, in order from an object side, a front group G1 having negative refractive power, and a rear group G2 having positive refractive power.

The front group G1 is composed of, in order from the object side, a negative meniscus lens L11 having a convex surface facing the object side and a positive meniscus lens L12 having a convex surface facing the object side. The negative meniscus lens L11 is a socalled compound type aspherical lens which is composed of a resin layer and a glass substrate and whose aspherical surface is applied on the image plane side lens surface.

The rear group G2 is composed of, in order from the object side, a first partial group LA having positive refractive power, an aperture stop S, a second partial group LB having negative refractive power, a third partial group LC having positive refractive power and a negative meniscus lens LD having a convex surface facing the image side.

The first partial group LA is composed of, in order from the object side, a double convex positive lens L21 and a positive meniscus lens L22 having a convex surface facing the object side.

The second partial group LB is composed of only a cemented lens constructed by, in order from the object side, a double convex positive lens L23 cemented with a double concave negative lens L24.

The third partial group LC is composed of only a double convex positive lens L25.

In the zoom lens system of the present Example 1, zooming from the wide angle end state to the telephoto end state is performed by varying a distance between the front group G1 and the rear group G2.

Various values associated with the zoom lens system according to Example 1 are listed in Table 1 below.

In (Specifications), f denotes a focal length of the zoom lens system, FNO denotes an f-number, ω denotes a half angle of view (unit "°"), Y denotes an image height, TL denotes a total length the optical system, and Σd denotes a distance between the most object side lens surface (first lens surface) and the most image side lens surface. W denotes upon focusing on an infinitely distant object in the wide-angle end state, M denotes upon focusing on an infinitely distant object in an intermediate focal length state, T denotes upon focusing on an infinitely distant object in the telephoto end state.

In (Surface Data), m shows the lens surface number counted in order from the object side, r shows a radius of curvature of the lens surface, d shows a distance from a lens surface to the next lens surface, nd shows refractive index of the material at d-line (wavelength λ=587.6 nm), and νd shows Abbe number of the material at d-line (wavelength λ=587.6 nm). OP denotes the object surface, and I denotes the image plane. Meanwhile, r=∞ denotes a plane surface. The mark "*" put at the left side of the surface number shows an aspherical surface.

In (Aspherical Surface Data), with respect to the aspherical surface shown in the (Surface Data), a conical coefficient and an aspherical coefficient are shown in the case where the aspherical surface is exhibited by the following expression:

$$X(y)=(y^2/r)/[1+\{1-\kappa\times(y^2/r^2)\}^{1/2}]+A4\times y^4+A6\times y^6+A8\times y^8+A10\times y^{10}+A12\times y^{12}$$

where y denotes a vertical height from the optical axis, X(y) denotes a displacement amount along the optical axis at the vertical height y, r denotes a radius of curvature of a reference sphere (paraxial radius of curvature), κ denotes a conical coefficient, and An denotes an aspherical coefficient of n-th order. Meanwhile, "E-n" denotes "×10$^{-n}$", and for example "1.234E-05" denotes "1.234×10$^{-5}$".

In (Variable Distances Data), d0 denotes a distance from the object surface OP to the first surface, dm (m: integer) denotes a variable surface to surface distance of the m-th surface, BF denotes a back focus, and ACBF denotes an air converted value of the back focus. In (Lens Group Data), a starting surface number ST and a focal length of each group are shown. In (Values for Conditional Expressions), values for respective conditional expressions are shown.

In table 1, "mm" is generally used for the unit of length such as the focal length f, and the radius of curvature r. However, since similar optical performance can be obtained by an optical system proportionally enlarged or reduced its dimension, the unit is not necessarily to be limited to "mm".

The explanation of reference symbols in Table 1 described above is the same in the other Examples.

TABLE 1

1
(Specifications)
Zoom Ratio: 2.89

| | W | | M | | T |
|---|---|---|---|---|---|
| f = | 18.50 | ~ | 28.00 | ~ | 53.40 |
| FNO = | 3.60 | ~ | 4.38 | ~ | 5.88 |
| ω = | 39.00 | ~ | 27.15 | ~ | 14.92° |
| Y = | 21.60 | ~ | 21.60 | ~ | 21.60 |
| TL = | 100.59 | ~ | 91.89 | ~ | 99.39 |
| Σd = | 82.55 | ~ | 64.95 | ~ | 48.65 |
| BF = | 18.03 | ~ | 26.94 | ~ | 50.74 |

(Surface Data)

| m | r | d | nd | νd |
|---|---|---|---|---|
| OP | ∞ | | | |
| 1) | 330.5590 | 1.6000 | 1.883000 | 40.77 |
| 2) | 17.0000 | 0.1000 | 1.495210 | 56.34 |
| *3) | 12.8400 | 8.7841 | 1.000000 | |
| 4) | 35.0398 | 3.5000 | 1.846660 | 23.78 |

TABLE 1-continued

| | | | | |
|---|---|---|---|---|
| 5) | 142.9846 | d5 | 1.000000 | |
| 6) | 17.2242 | 3.5000 | 1.497820 | 82.56 |
| 7) | −218.6039 | 0.1000 | 1.000000 | |
| 8) | 26.4177 | 2.0000 | 1.487490 | 70.45 |
| 9) | 65.6239 | 2.0000 | 1.000000 | |
| 10) | ∞ | 0.5000 | 1.000000 | Aperture Stop S |
| 11) | 15.9648 | 5.0000 | 1.497820 | 82.56 |
| 12) | −20.6539 | 3.0000 | 1.883000 | 40.77 |
| 13) | 13.6534 | 3.0738 | 1.000000 | |
| 14) | 27.9861 | 10.0000 | 1.497820 | 82.56 |
| 15) | −24.9793 | 2.5000 | 1.000000 | |
| 16) | −10.4022 | 2.0000 | 1.516800 | 64.12 |
| 17) | −14.0274 | BF | 1.000000 | |
| I | ∞ | | | |

(Aspherical Surface Data)
Surface Number: 3

κ = 0.6840
A4 = −5.08061E−05
A6 = −1.12876E−07
A8 = 4.89934E−12
A10 = −2.18843E−12
A12 = −0.24867E−14

(Variable Distances)

| | W | M | T |
|---|---|---|---|
| f = | 18.50000 | 28.00000 | 53.40000 |
| d0 = | ∞ | ∞ | ∞ |
| d5 = | 34.89578 | 17.29401 | 0.98991 |
| BF = | 18.03301 | 26.93703 | 50.74357 |

(Lens Group Data)

| Group | ST | f |
|---|---|---|
| G1 | 1 | −32.00000 |
| G2 | 6 | 29.99249 |

(Values for Conditional Expressions)

| | |
|---|---|
| (1) | (r2 − r1)/(r2 + r1) = 0.1484 |
| (2) | BFw/fw = 0.975 |
| (3) | f2/fw = 1.622 |
| (4) | (−fd)/f2 = 3.197 |
| (5) | fc/f2 = 0.943 |
| (6) | fa/f2 = 0.132 |
| (7) | (−fb)/f2 = 0.794 |

Figure 2B:
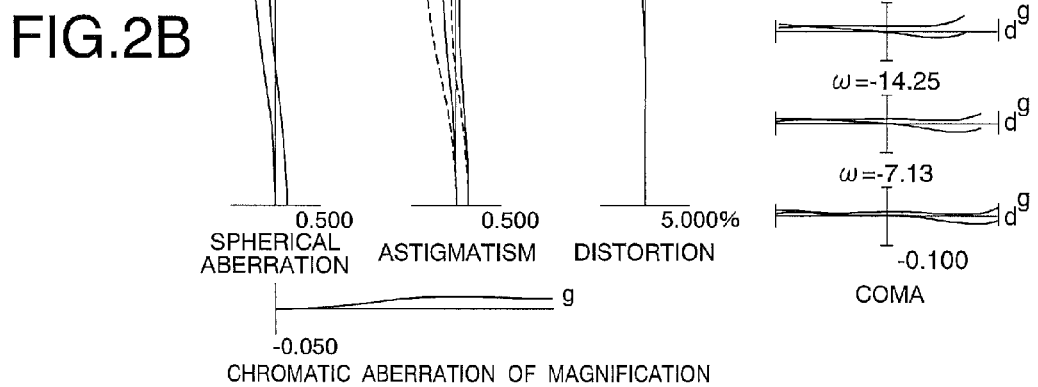
Figure 2C:
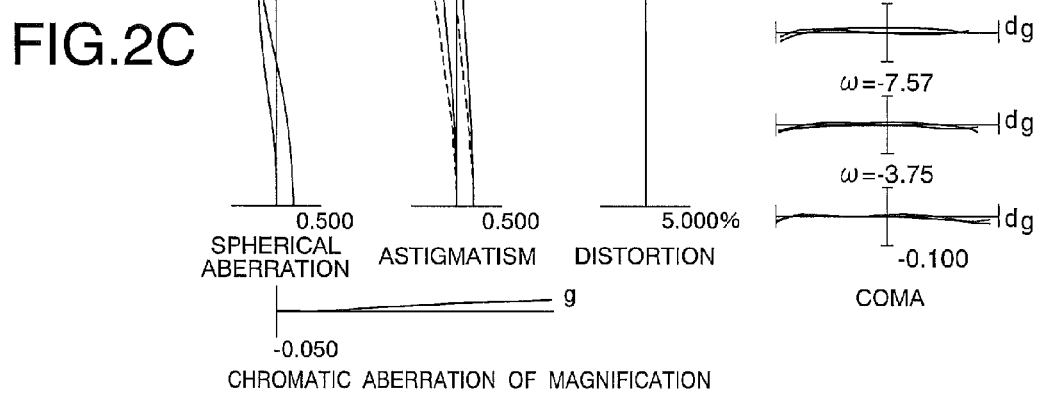

FIGS. 2A, 2B and 2C are graphs, respectively, showing various aberrations upon focusing on an infinitely distant object in the wide-angle end state, in an intermediate focal length state and in the telephoto end state of the zoom lens system according to Example 1 of the present application.

In the respective graphs, FNO denotes an f-number, Y denotes an image height, ω denotes a half angle of view, d denotes an aberration curve at d-line (wavelength λ=587.6 nm), and g denotes an aberration curve at g-line (wavelength λ=435.8 nm). In graphs showing spherical aberration, f-number corresponding to the maximum aperture is shown. In the respective graphs showing astigmatism and distortion, the maximum values of the image height are shown. In the graph showing astigmatism, a solid line indicates a sagittal image plane, and a broken line indicates a meridional image plane. In graphs showing coma, a solid line indicates a meridional coma. The above-described explanation regarding various aberration graphs is the same in the other Examples.

As is apparent from the respective graphs showing aberrations, the zoom lens system according to Example 1 shows superb optical performance as a result of good corrections to various aberrations including spherical aberration, curvature of field, astigmatism and coma.

Example 2

FIG. 3 is a sectional view showing a lens configuration of a zoom lens system and a zoom trajectory thereof according to Example 2 of the present application.

The zoom lens system according to Example 2 is composed of, in order from an object side, a front group G1 having negative refractive power, and a rear group G2 having positive refractive power.

The front group G1 is composed of, in order from the object side, a negative meniscus lens L11 having a convex surface facing the object side and a double concave negative lens L12, and a positive meniscus lens L13 having a convex surface facing the object side. The negative meniscus lens L11 is a socalled compound type aspherical lens which is composed of a resin layer and a glass substrate and whose aspherical surface is applied on the image plane side lens surface.

The rear group G2 is composed of, in order from the object side, a first partial group LA having positive refractive power, an aperture stop S, a second partial group LB having negative refractive power, a third partial group LC having positive refractive power and a negative meniscus lens LD having a convex surface facing the image side.

The first partial group LA is composed of, in order from the object side, a positive meniscus lens L21 having a convex surface facing the object side and a positive meniscus lens L22 having a convex surface facing the object side.

The second partial group LB is composed of only a cemented lens constructed by, in order from the object side, a double convex positive lens L23 cemented with a double concave negative lens L24.

The third partial group LC is composed of only a double convex positive lens L25.

In the present Example, a dummy glass DG that is equivalent to an optical low pass filter is disposed between the rear group G2 and the image plane I.

In the zoom lens system of Example 1, zooming from the wide angle end state to the telephoto end state is conducted by varying a distance between the front group G1 and the rear group G2.

Various values associated with the zoom lens system according to Example 2 are listed in Table 2 below.

TABLE 2

2
(Specifications)
Zoom Ratio: 2.89

| | W | | M | | T |
|---|---|---|---|---|---|
| f = | 18.50 | ~ | 28.00 | ~ | 53.40 |
| FNO = | 3.59 | ~ | 4.26 | ~ | 5.86 |
| ω = | 39.10 | ~ | 27.28 | ~ | 14.94° |
| Y = | 21.60 | ~ | 21.60 | ~ | 21.60 |
| TL = | 105.59 | ~ | 96.90 | ~ | 104.40 |
| Σd = | 104.65 | ~ | 95.95 | ~ | 103.45 |
| ACBF = | 18.26 | ~ | 27.17 | ~ | 50.98 |

(Surface Data)

| m | r | d | nd | vd |
|---|---|---|---|---|
| OP | ∞ | | | |
| 1) | 55.0935 | 1.6000 | 1.772500 | 49.61 |
| 2) | 16.0000 | 0.1000 | 1.495210 | 56.34 |

TABLE 2-continued

| | | | | |
|---|---|---|---|---|
| *3) | 13.2240 | 11.0000 | 1.000000 | |
| 4) | −95.1749 | 1.8000 | 1.772500 | 49.61 |
| 5) | 1148.7166 | 0.1000 | 1.000000 | |
| 6) | 32.5143 | 3.0000 | 1.846660 | 23.78 |
| 7) | 73.8970 | d7 | 1.000000 | |
| 8) | 22.0000 | 2.8000 | 1.497820 | 82.56 |
| 9) | 3731.8937 | 0.1000 | 1.000000 | |
| 10) | 25.1558 | 2.3000 | 1.497820 | 82.56 |
| 11) | 669.5875 | 2.0000 | 1.000000 | |
| 12) | ∞ | 0.5000 | 1.000000 | Aperture Stop S |
| 13) | 17.0335 | 5.0000 | 1.497820 | 82.56 |
| 14) | −33.4129 | 3.0000 | 1.883000 | 40.77 |
| 15) | 14.3628 | 4.2400 | 1.000000 | |
| 16) | 29.0292 | 10.0000 | 1.516800 | 64.12 |
| 17) | −31.2271 | 2.2000 | 1.000000 | |
| 18) | −10.9750 | 2.0000 | 1.772500 | 49.61 |
| 19) | −14.0274 | d19 | 1.000000 | |
| 20) | ∞ | 2.0000 | 1.516800 | 64.12 DG |
| 21) | ∞ | 0.9460 | 1.000000 | |
| I | ∞ | | | |

(Aspherical Surface Data)
Surface Number: 3

$\kappa$ = 0.1730
A4 = 1.67132E−05
A6 = −1.57854E−08
A8 = 6.41734E−10
A10 = −3.69637E−12
A12 = 0.72191E−14

(Variable Distances)

| W | M | T |
|---|---|---|
| f = 18.50000 | 28.00000 | 53.40000 |
| d0 = ∞ | ∞ | ∞ |
| d7 = 34.90737 | 17.30560 | 1.00149 |
| d19 = 16.00000 | 24.90402 | 48.71056 |

(Lens Group Data)

| Group | ST | f |
|---|---|---|
| G1 | 1 | −32.00000 |
| G2 | 8 | 29.99249 |

(Values for Conditional Expressions)

| | |
|---|---|
| (1) | (r2 − r1)/(r2 + r1) = 0.1221 |
| (2) | BFw/fw = 0.987 |
| (3) | f2/fw = 1.622 |
| (4) | (−fd)/f2 = 3.046 |
| (5) | fc/f2 = 1.029 |
| (6) | fa/f2 = 0.818 |
| (7) | (−fb)/f2 = 0.957 |

Figure 4A:
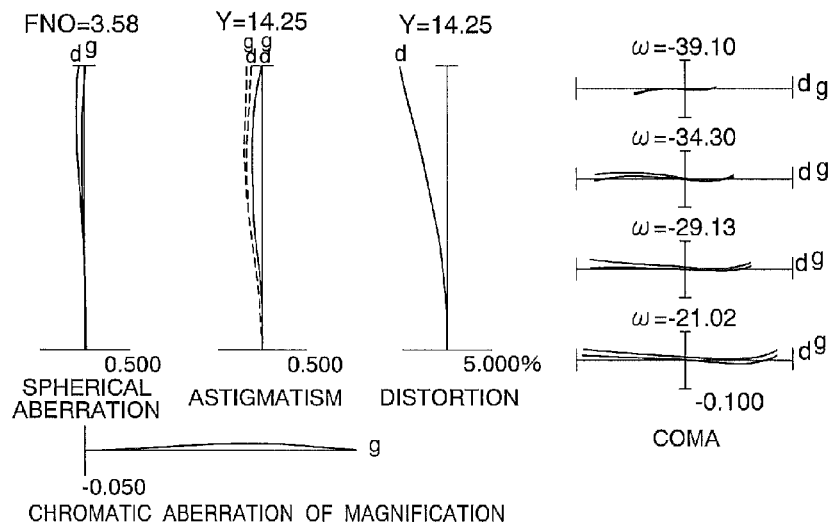
FIGS. 4A, 4B and 4C are graphs, respectively, showing various aberrations upon focusing on an infinitely distant object in the wide-angle end state, in an intermediate focal length state and in the telephoto end state of the zoom lens system according to Example 2 of the present application.
Figure 4B:
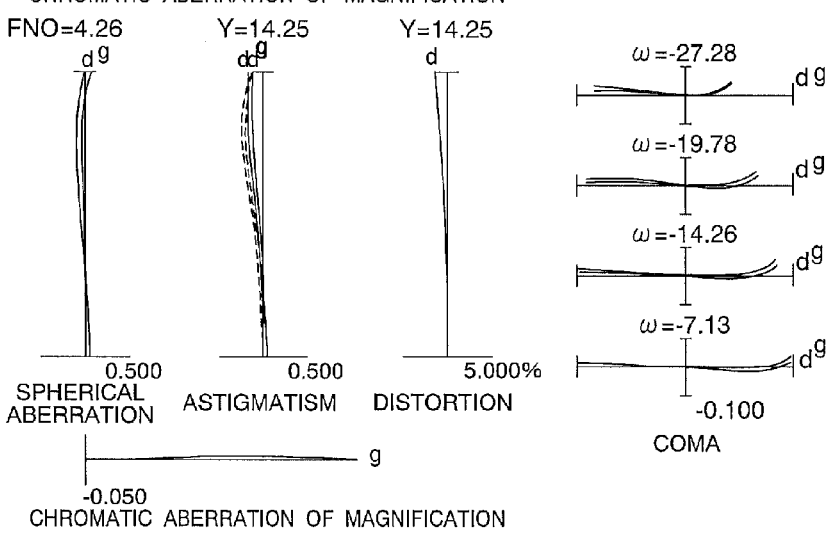
Figure 4C:
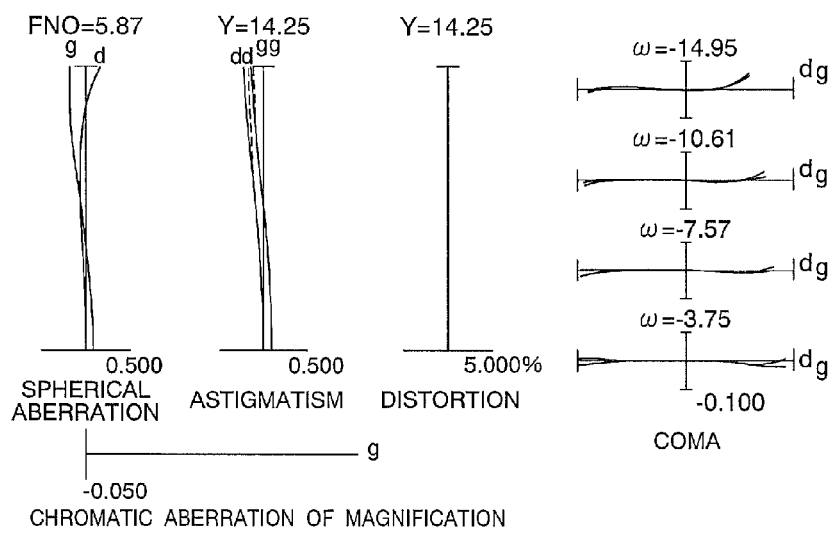

FIGS. 4A, 4B and 4C are graphs, respectively, showing various aberrations upon focusing on an infinitely distant object in the wide-angle end state, in an intermediate focal length state and in the telephoto end state of the zoom lens system according to Example 2 of the present application.

As is apparent from the respective graphs showing aberrations, the zoom lens system according to Example 2 shows superb optical performance as a result of good corrections to various aberrations including spherical aberration, curvature of field, astigmatism and coma.

Example 3

Figure 5:
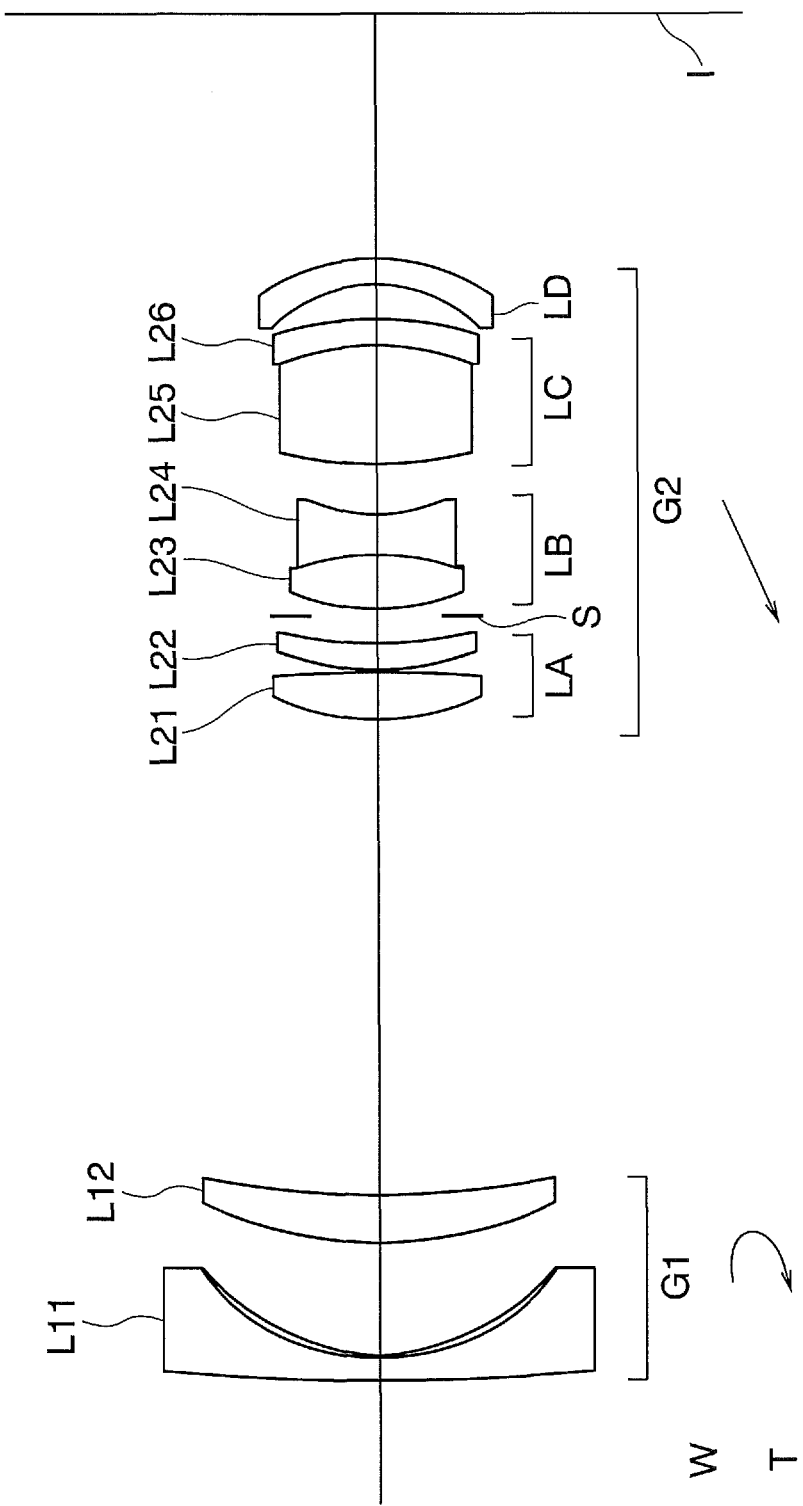
FIG. 5 is a sectional view showing a lens configuration of a zoom lens system according to Example 3 of the present application.

FIG. 5 is a sectional view showing a lens configuration of a zoom lens system and a zoom trajectory thereof according to Example 3 of the present application.

The zoom lens system according to Example 3 is composed of, in order from an object side, a front group G1 having negative refractive power, and a rear group G2 having positive refractive power.

The front group G1 is composed of, in order from the object side, a negative meniscus lens L11 having a convex surface facing the object side and a positive meniscus lens L12 having a convex surface facing the object side. The negative meniscus lens L11 is a socalled compound type aspherical lens which is composed of a resin layer and a glass substrate and whose aspherical surface is applied on the image plane side lens surface.

The rear group G2 is composed of, in order from the object side, a first partial group LA having positive refractive power, an aperture stop S, a second partial group LB having negative refractive power, a third partial group LC having positive refractive power and a negative meniscus lens LD having a convex surface facing the image side.

The first partial group LA is composed of, in order from the object side, a double convex positive lens L21 and a positive meniscus lens L22 having a convex surface facing the object side.

The second partial group LB is composed of, in order from the object side, only a cemented lens constructed by, in order from the object side, a double convex positive lens L23 cemented with a double concave negative lens L24.

The third partial group LC is composed of only a cemented lens constructed by, in order from the object side, a double convex positive lens L25 cemented with a negative meniscus lens L26 having a convex surface facing the image side.

In the zoom lens system of the present Example 3, zooming from the wide angle end state to the telephoto end state is conducted by varying a distance between the front group G1 and the rear group G2.

Various values associated with the zoom lens system according to Example 3 are listed in Table 3 below.

TABLE 3

3
(Specifications)
Zoom Ratio: 2.89

| | W | | M | | T |
|---|---|---|---|---|---|
| f = | 18.50 | ~ | 28.00 | ~ | 53.40 |
| FNO = | 4.09 | ~ | 4.15 | ~ | 5.86 |
| ω = | 40.00 | ~ | 27.42 | ~ | 14.96° |
| Y = | 21.60 | ~ | 21.60 | ~ | 21.60 |
| TL = | 100.34 | ~ | 91.64 | ~ | 99.14 |
| Σd = | 82.37 | ~ | 64.77 | ~ | 48.46 |
| BF = | 17.97 | ~ | 26.87 | ~ | 50.68 |

(Surface Data)

| m | r | d | nd | νd |
|---|---|---|---|---|
| OP | ∞ | | | |
| 1) | 192.4821 | 1.6000 | 1.883000 | 40.77 |
| 2) | 17.0000 | 0.0500 | 1.495210 | 56.34 |
| *3) | 14.0120 | 8.4428 | 1.000000 | |
| 4) | 30.3318 | 3.5000 | 1.808090 | 22.79 |
| 5) | 72.5178 | d5 | 1.000000 | |
| 6) | 17.8809 | 3.5000 | 1.516800 | 64.12 |
| 7) | −94.2081 | 0.1000 | 1.000000 | |
| 8) | 19.8773 | 2.0000 | 1.516800 | 64.12 |
| 9) | 30.3413 | 2.0000 | 1.000000 | |
| 10) | ∞ | 0.5000 | 1.000000 | Aperture Stop S |
| 11) | 17.2606 | 4.0000 | 1.518230 | 58.89 |
| 12) | −18.9993 | 3.0000 | 1.834000 | 37.17 |
| 13) | 13.4646 | 3.6127 | 1.000000 | |
| 14) | 29.2549 | 8.6302 | 1.497820 | 82.56 |

TABLE 3-continued

| | | | | |
|---|---|---|---|---|
| 15) | −19.8743 | 2.0000 | 1.772500 | 49.61 |
| 16) | −24.7511 | 2.5000 | 1.000000 | |
| 17) | −10.9147 | 2.0000 | 1.516800 | 64.12 |
| 18) | −14.0274 | BF | 1.000000 | |
| I | ∞ | | | |

(Aspherical Surface Data)
Surface Number: 3

κ = 0.4626
A4 = −2.54727E−05
A6 = 2.53790E−08
A8 = −3.22292E−10
A10 = 1.25143E−13
A12 = 0.00000

(Variable Distances)

| W | M | T |
|---|---|---|
| f = 18.50000 | 28.00000 | 53.40000 |
| d0 = ∞ | ∞ | ∞ |
| d5 = 34.93211 | 17.33034 | 1.02623 |
| BF = 17.97024 | 26.87426 | 50.68080 |

(Lens Group Data)

| Group | ST | f |
|---|---|---|
| G1 | 1 | −32.00000 |
| G2 | 6 | 29.99249 |

(Values for Conditional Expressions)

| | |
|---|---|
| (1) | (r2 − r1)/(r2 + r1) = 0.1248 |
| (2) | BFw/fw = 0.971 |
| (3) | f2/fw = 1.622 |
| (4) | (−fd)/f2 = 4.062 |
| (5) | fc/f2 = 1.024 |
| (6) | fa/f2 = 0.763 |
| (7) | (−fb)/f2 = 0.816 |

Figure 6A:
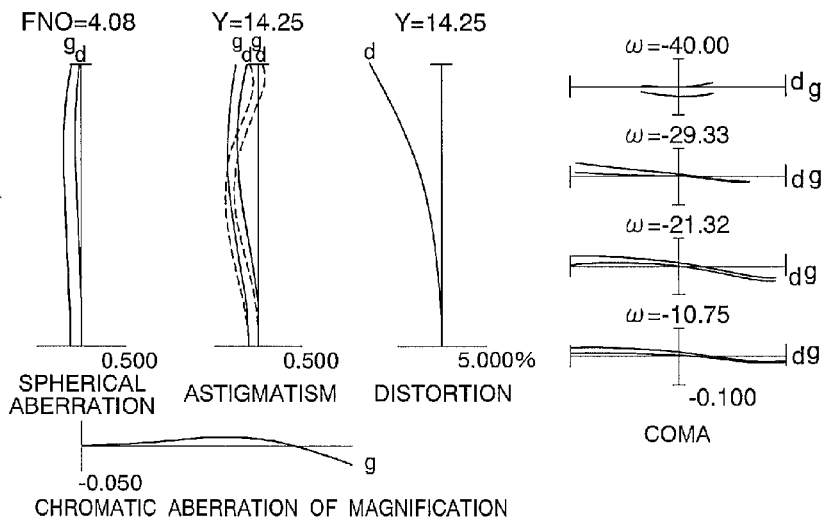
FIGS. 6A, 6B and 6C are graphs, respectively, showing various aberrations upon focusing on an infinitely distant object in the wide-angle end state, in an intermediate focal length state and in the telephoto end state of the zoom lens system according to Example 3 of the present application.
Figure 6B:
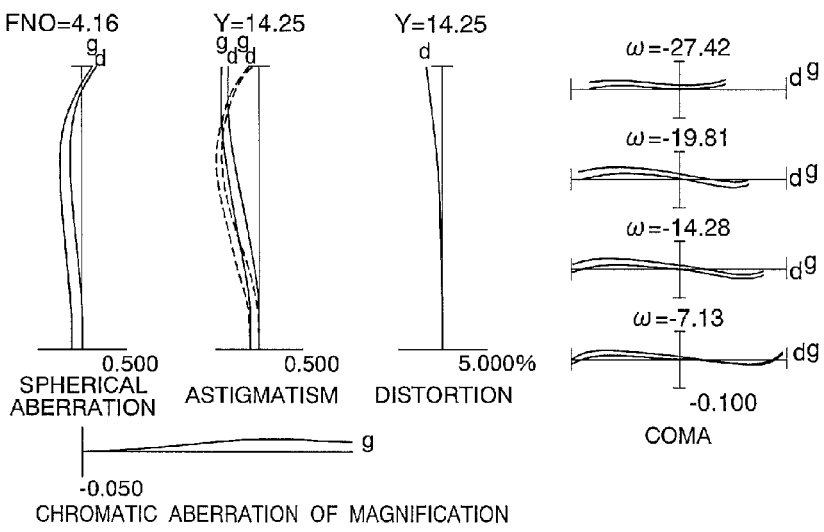
Figure 6C:
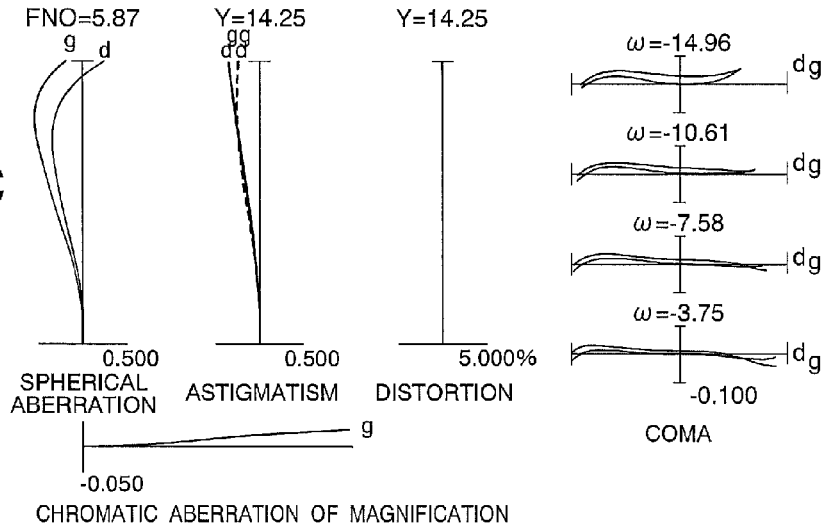

FIGS. 6A, 6B and 6C are graphs, respectively, showing various aberrations upon focusing on an infinitely distant object in the wide-angle end state, in an intermediate focal length state and in the telephoto end state of the zoom lens system according to Example 3 of the present application.

As is apparent from the respective graphs showing aberrations, the zoom lens system according to Example 3 shows superb optical performance as a result of good corrections to various aberrations including spherical aberration, curvature of field, astigmatism and coma.

Example 4

Figure 7:
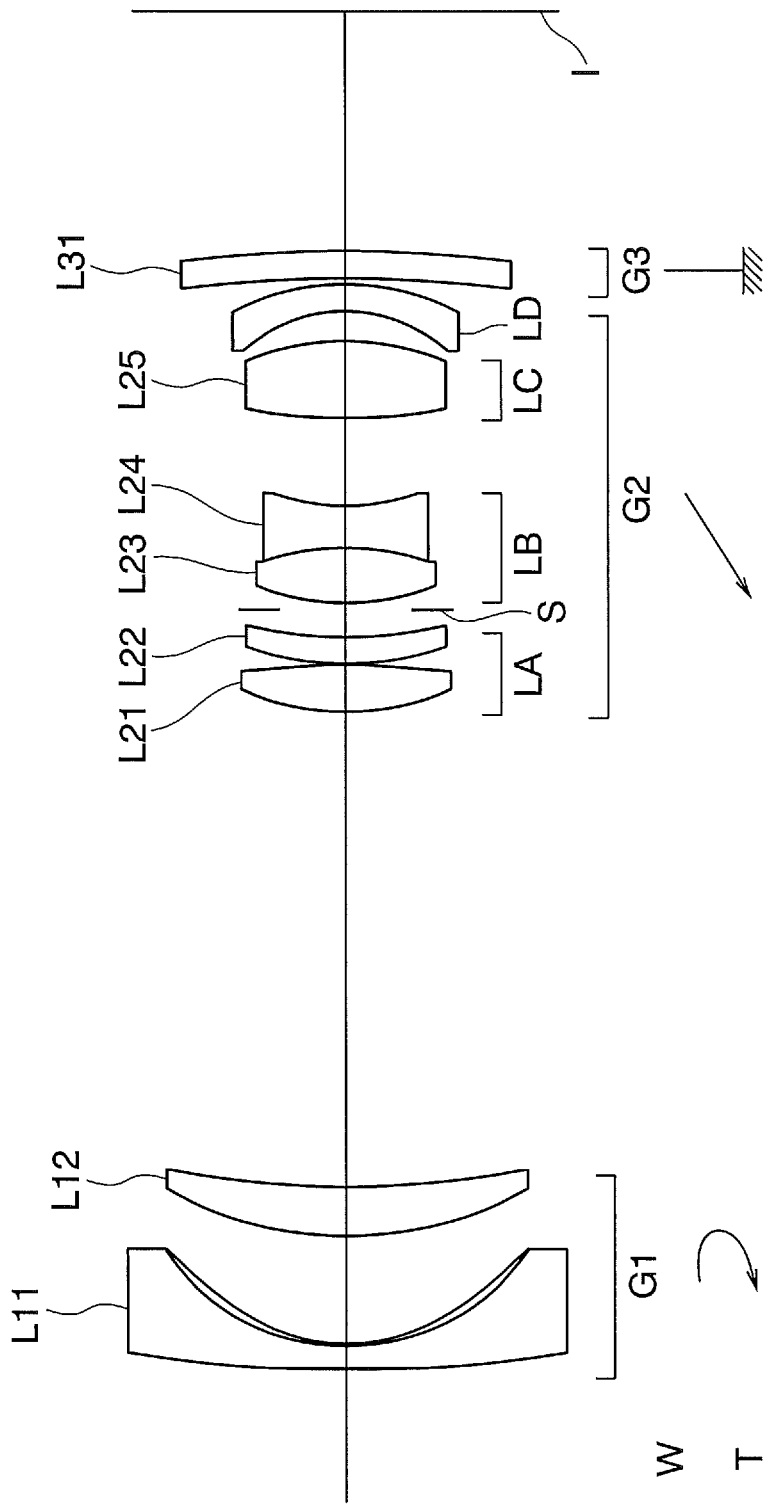
FIG. 7 is a sectional view showing a lens configuration of a zoom lens system according to Example 4 of the present application.

FIG. 7 is a sectional view showing a lens configuration of a zoom lens system and a zoom trajectory thereof according to Example 4 of the present application.

The zoom lens system according to Example 4 is composed of, in order from an object side, a front group G1 having negative refractive power, a rear group G2 having positive refractive power and a lens group G3 having negative refractive power.

The front group G1 is composed of, in order from the object side, a negative meniscus lens L11 having a convex surface facing the object side and a positive meniscus lens L12 having a convex surface facing the object side. The negative meniscus lens L11 is a socalled compound type aspherical lens which is composed of a resin layer and a glass substrate and whose aspherical surface is applied on the image plane side lens surface.

The rear group G2 is composed of, in order from the object side, a first partial group LA having positive refractive power, an aperture stop S, a second partial group LB having negative refractive power, a third partial group LC having positive refractive power and a negative meniscus lens LD having a convex surface facing the image side.

The first partial group LA is composed of, in order from the object side, a double convex positive lens L21 and a positive meniscus lens L22 having a convex surface facing the object side.

The second partial group LB is composed of only a cemented lens constructed by, in order from the object side, a double convex positive lens L23 cemented with a double concave negative lens L24.

The third partial group LC is composed of only a double convex positive lens L25.

The lens group G3 is composed of only a negative meniscus lens L31 having a convex surface facing the image side.

In the zoom lens system of the present Example 4, zooming from the wide angle end state to the telephoto end state is conducted by varying a distance between the front group G1 and the rear group G2 and a distance between the rear group G2 and the lens group G3.

Various values associated with the zoom lens system according to Example 4 are listed in Table 4 below.

TABLE 4

4
(Specifications)
Zoom Ratio: 2.89

| | W | | M | | T |
|---|---|---|---|---|---|
| f = | 18.50 | ~ | 28.00 | ~ | 53.40 |
| FNO = | 4.20 | ~ | 4.70 | ~ | 5.91 |
| ω = | 38.99 | ~ | 27.17 | ~ | 14.94° |
| Y = | 21.60 | ~ | 21.60 | ~ | 21.60 |
| TL = | 99.45 | ~ | 90.58 | ~ | 97.66 |
| Σd = | 81.93 | ~ | 73.06 | ~ | 80.14 |
| BF = | 17.53 | ~ | 17.53 | ~ | 17.53 |

(Surface Data)

| m | r | d | nd | νd |
|---|---|---|---|---|
| OP | ∞ | | | |
| 1) | 131.6656 | 1.6000 | 1.883000 | 40.77 |
| 2) | 16.0000 | 0.1000 | 1.495210 | 56.34 |
| *3) | 12.4224 | 7.9955 | 1.000000 | |
| 4) | 27.3779 | 3.5000 | 1.846660 | 23.78 |
| 5) | 65.4766 | d5 | 1.000000 | |
| 6) | 18.6423 | 3.5000 | 1.497820 | 82.56 |
| 7) | −64.7904 | 0.1000 | 1.000000 | |
| 8) | 21.3192 | 2.0000 | 1.516800 | 64.12 |
| 9) | 30.7902 | 2.0000 | 1.000000 | |
| 10) | ∞ | 0.5000 | 1.000000 | Aperture Stop S |
| 11) | 16.7175 | 4.0000 | 1.518230 | 58.89 |
| 12) | −18.8232 | 3.0000 | 1.834000 | 37.17 |
| 13) | 15.1525 | 6.6162 | 1.000000 | |
| 14) | 45.0398 | 5.4451 | 1.497820 | 82.56 |
| 15) | −20.8277 | 2.2000 | 1.000000 | |
| 16) | −11.5228 | 2.0000 | 1.516800 | 64.12 |
| 17) | −17.8355 | d17 | 1.000000 | |
| 18) | −98.0000 | 2.0000 | 1.620040 | 36.24 |
| 19) | −100.0000 | BF | 1.000000 | |
| I | ∞ | | | |

(Aspherical Surface Data)
Surface Number: 3

κ = 0.3805
A4 = −2.43458E−05
A6 = −1.67367E−08
A8 = −1.81369E−10
A10 = −5.31979E−13
A12 = 0.00000

TABLE 4-continued (Variable Distances)

| | W | M | T |
|---|---|---|---|
| f = | 18.50000 | 28.00000 | 53.40000 |
| d0 = | ∞ | ∞ | ∞ |
| d5 = | 34.94688 | 17.32145 | 0.99544 |
| d17 = | 0.42388 | 9.17840 | 32.58522 |
| BF = | 17.52548 | 17.52548 | 17.52548 |

(Lens Group Data)

| Group | ST | f |
|---|---|---|
| G1 | 1 | −32.00000 |
| G2 | 6 | 29.75961 |
| G3 | 18 | −12802.71595 |

(Values for Conditional Expressions)

| | |
|---|---|
| (1) | (r2 − r1)/(r2 + r1) = 0.2151 |
| (2) | BFw/fw = 0.947 |
| (3) | f2/fw = 1.609 |
| (4) | (−fd)/f2 = 2.373 |
| (5) | fc/f2 = 0.982 |
| (6) | fa/f2 = 0.798 |
| (7) | (−fb)/f2 = 0.988 |

Figure 8A:
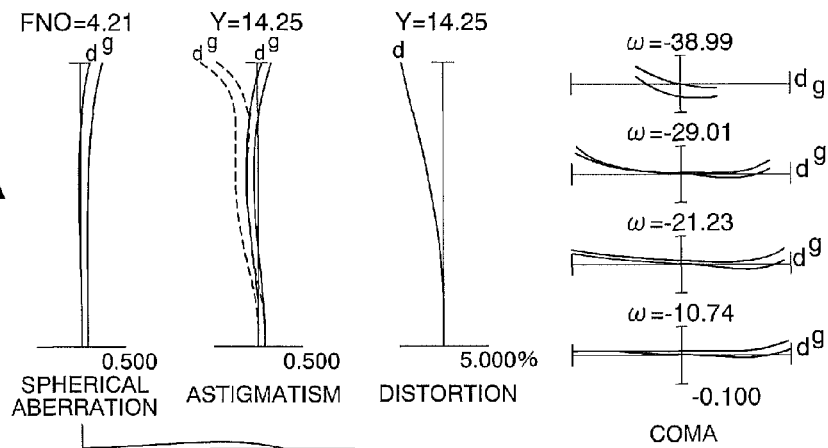
FIGS. 8A, 8B and 8C are graphs, respectively, showing various aberrations upon focusing on an infinitely distant object in the wide-angle end state, in an intermediate focal length state and in the telephoto end state of the zoom lens system according to the Example 4 of the present application.
Figure 8B:
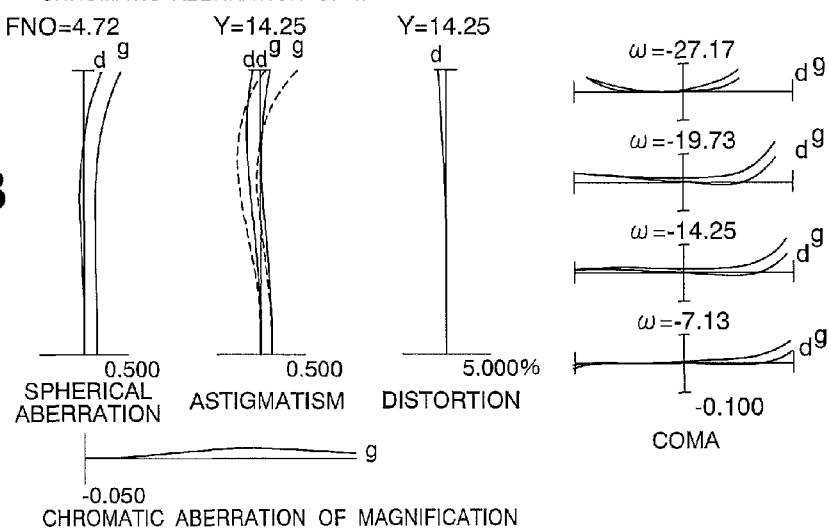
Figure 8C:
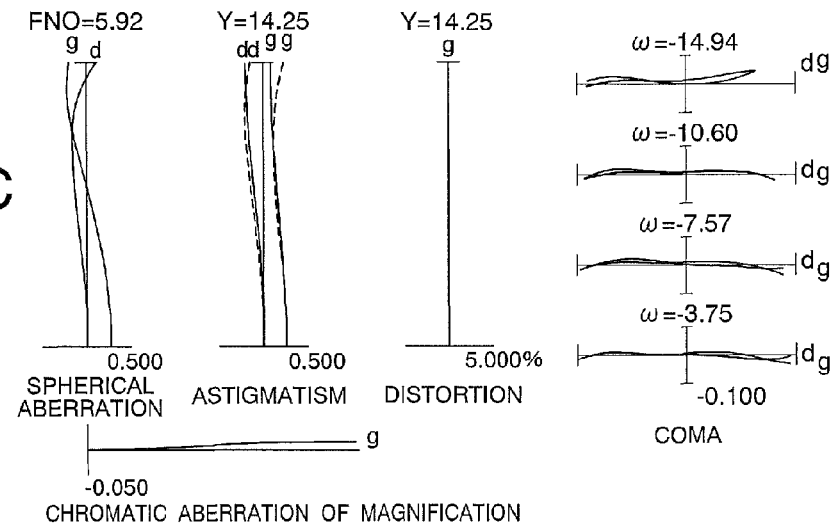

FIGS. 8A, 8B and 8C are graphs, respectively, showing various aberrations upon focusing on an infinitely distant object in the wide-angle end state, in an intermediate focal length state and in the telephoto end state of the zoom lens system according to Example 4 of the present application.

As is apparent from the respective graphs showing aberrations, the zoom lens system according to Example 4 shows superb optical performance as a result of good corrections to various aberrations including spherical aberration, curvature of field, astigmatism and coma.

Example 5

Figure 9:
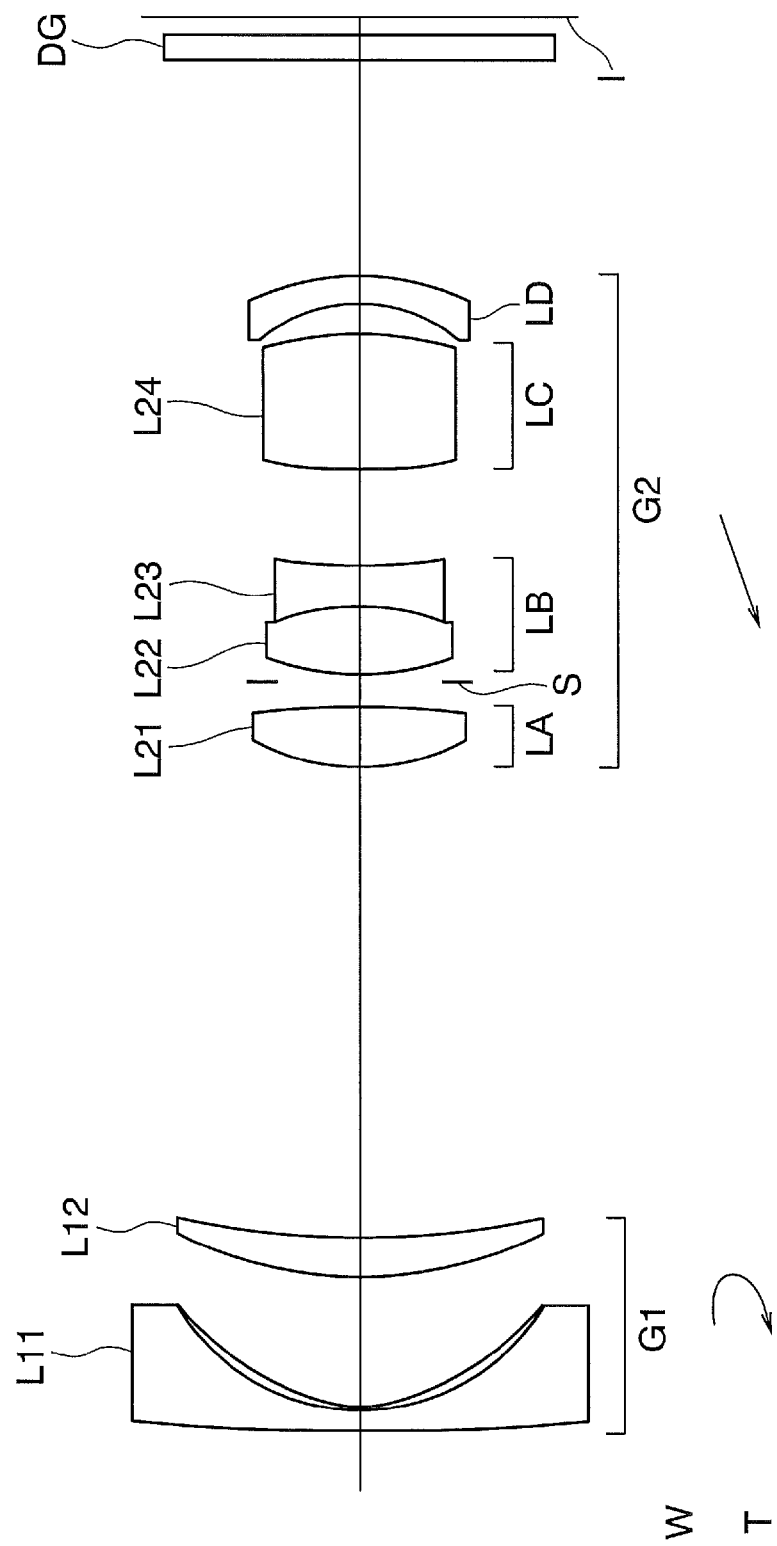
FIG. 9 is a sectional view showing a lens configuration of a zoom lens system according to Example 5 of the present application.

FIG. 9 is a sectional view showing a lens configuration of a zoom lens system and a zoom trajectory thereof according to Example 5 of the present application.

The zoom lens system according to Example 5 is composed of, in order from an object side, a front group G1 having negative refractive power, and a rear group G2 having positive refractive power.

The front group G1 is composed of, in order from the object side, a negative meniscus lens L11 having a convex surface facing the object side and a positive meniscus lens L12 having a convex surface facing the object side. The negative meniscus lens L11 is a socalled compound type aspherical lens which is composed of a resin layer and a glass substrate and whose aspherical surface is applied on the image plane side lens surface.

The rear group G2 is composed of, in order from the object side, a first partial group LA having positive refractive power, an aperture stop S, a second partial group LB having negative refractive power, a third partial group LC having positive refractive power and a negative meniscus lens LD having a convex surface facing the image side.

The first partial group LA is composed of only a double convex positive lens L21.

The second partial group LB is composed of only a cemented lens constructed by, in order from the object side, a double convex positive lens L22 cemented with a double concave negative lens L23.

The third partial group LC is composed of only a double convex positive lens L24.

Incidentally, in Example 5, a dummy glass DG that is equivalent to an optical low pass filter is disposed between the rear group G2 and the image plane I.

In the zoom lens system of the present Example 5, zooming from the wide angle end state to the telephoto end state is conducted by varying a distance between the front group G1 and the rear group G2.

Various values associated with the zoom lens system according to Example 5 are listed in Table 5 below.

TABLE 5

5
(Specifications)
Zoom Ratio: 2.89

| | W | | M | | T |
|---|---|---|---|---|---|
| f = | 18.50 | ~ | 28.00 | ~ | 53.40 |
| FNO = | 3.64 | ~ | 4.24 | ~ | 6.02 |
| ω = | 39.19 | ~ | 27.34 | ~ | 14.99° |
| Y = | 21.60 | ~ | 21.60 | ~ | 21.60 |
| TL = | 104.96 | ~ | 96.26 | ~ | 103.76 |
| Σd = | 103.71 | ~ | 95.00 | ~ | 102.51 |
| ACBF = | 18.57 | ~ | 27.47 | ~ | 51.28 |

(Surface Data)

| m | r | d | nd | νd | |
|---|---|---|---|---|---|
| OP | ∞ | | | | |
| 1) | 267.4602 | 1.6000 | 1.772500 | 49.61 | |
| 2) | 16.3000 | 0.1000 | 1.495210 | 56.34 | |
| *3) | 12.5861 | 9.7200 | 1.000000 | | |
| 4) | 30.7497 | 3.0000 | 1.846660 | 23.78 | |
| 5) | 66.1423 | d5 | 1.000000 | | |
| 6) | 17.3263 | 4.5000 | 1.497820 | 82.56 | |
| 7) | −77.9830 | 2.0000 | 1.000000 | | |
| 8) | ∞ | 0.5000 | 1.000000 | | Aperture Stop S |
| 9) | 21.7485 | 5.0000 | 1.497820 | 82.56 | |
| 10) | −18.6324 | 3.0000 | 1.883000 | 40.77 | |
| 11) | 44.9690 | 7.1800 | 1.000000 | | |
| 12) | 39.1634 | 10.0000 | 1.516800 | 64.12 | |
| 13) | −25.5283 | 2.2000 | 1.000000 | | |
| 14) | −11.6910 | 2.0000 | 1.772500 | 49.61 | |
| 15) | −19.6965 | d15 | 1.000000 | | |
| 16) | ∞ | 2.0000 | 1.516800 | 64.12 | DG |
| 17) | ∞ | 1.2503 | 1.000000 | | |
| I | ∞ | | | | |

(Aspherical Surface Data)
Surface Number: 3

κ = 0.2806
A4 = −9.32529E−06
A6 = −1.72692E−07
A8 = 1.20597E−09
A10 = −5.18297E−12
A12 = 0.72191E−14

(Variable Distances)

| | W | M | T |
|---|---|---|---|
| f = | 18.50000 | 28.00000 | 53.40000 |
| d0 = | ∞ | ∞ | ∞ |
| d5 = | 34.90627 | 17.30450 | 1.00040 |
| d15 = | 16.00000 | 24.90402 | 48.71056 |

(Lens Group Data)

| Group | ST | f |
|---|---|---|
| G1 | 1 | −32.00000 |
| G2 | 6 | 29.99249 |

TABLE 5-continued (Values for Conditional Expressions)

| | | |
|---|---|---|
| (1) | (r2 − r1)/(r2 + r1) = | 0.2550 |
| (2) | BFw/fw = | 1.004 |
| (3) | f2/fw = | 1.622 |
| (4) | (−fd)/f2 = | 1.393 |
| (5) | fc/f2 = | 1.052 |
| (6) | fa/f2 = | 0.964 |
| (7) | (−fb)/f2 = | 2.344 |

Figure 10A:
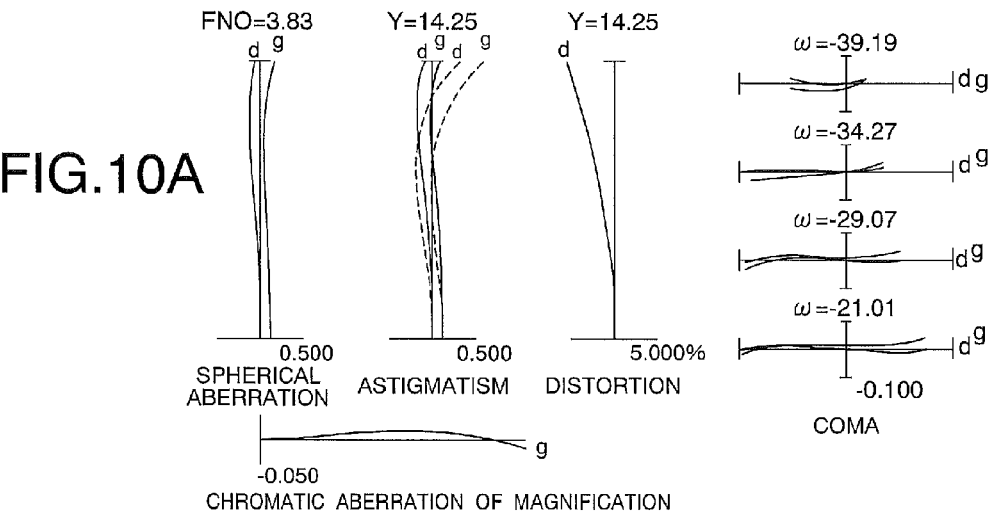
FIGS. 10A, 10B and 10C are graphs, respectively, showing various aberrations upon focusing on an infinitely distant object in the wide-angle end state, in an intermediate focal length state and in the telephoto end state of the zoom lens system according to the Example 5 of the present application.
Figure 10B:
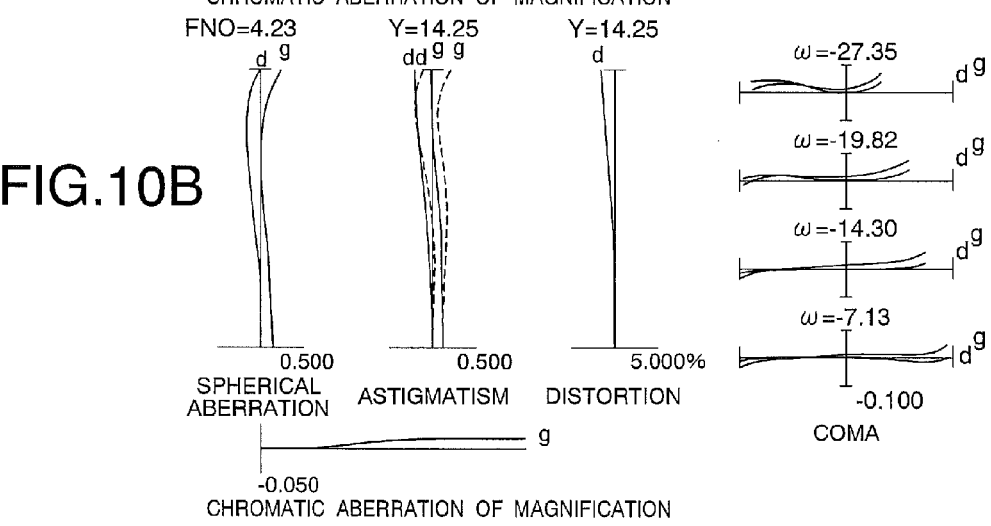
Figure 10C:
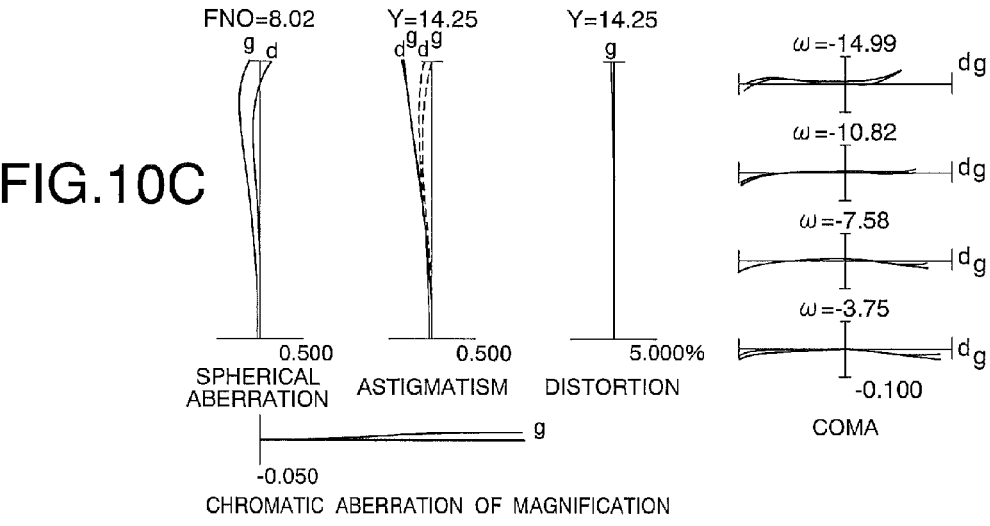

FIGS. 10A, 10B and 10C are graphs, respectively, showing various aberrations upon focusing on an infinitely distant object in the wide-angle end state, in an intermediate focal length state and in the telephoto end state of the zoom lens system according to Example 5 of the present application.

As is apparent from the respective graphs showing aberrations, the zoom lens system according to Example 5 shows superb optical performance as a result of good corrections to various aberrations including spherical aberration, curvature of field, astigmatism and coma.

Example 6

Figure 11:
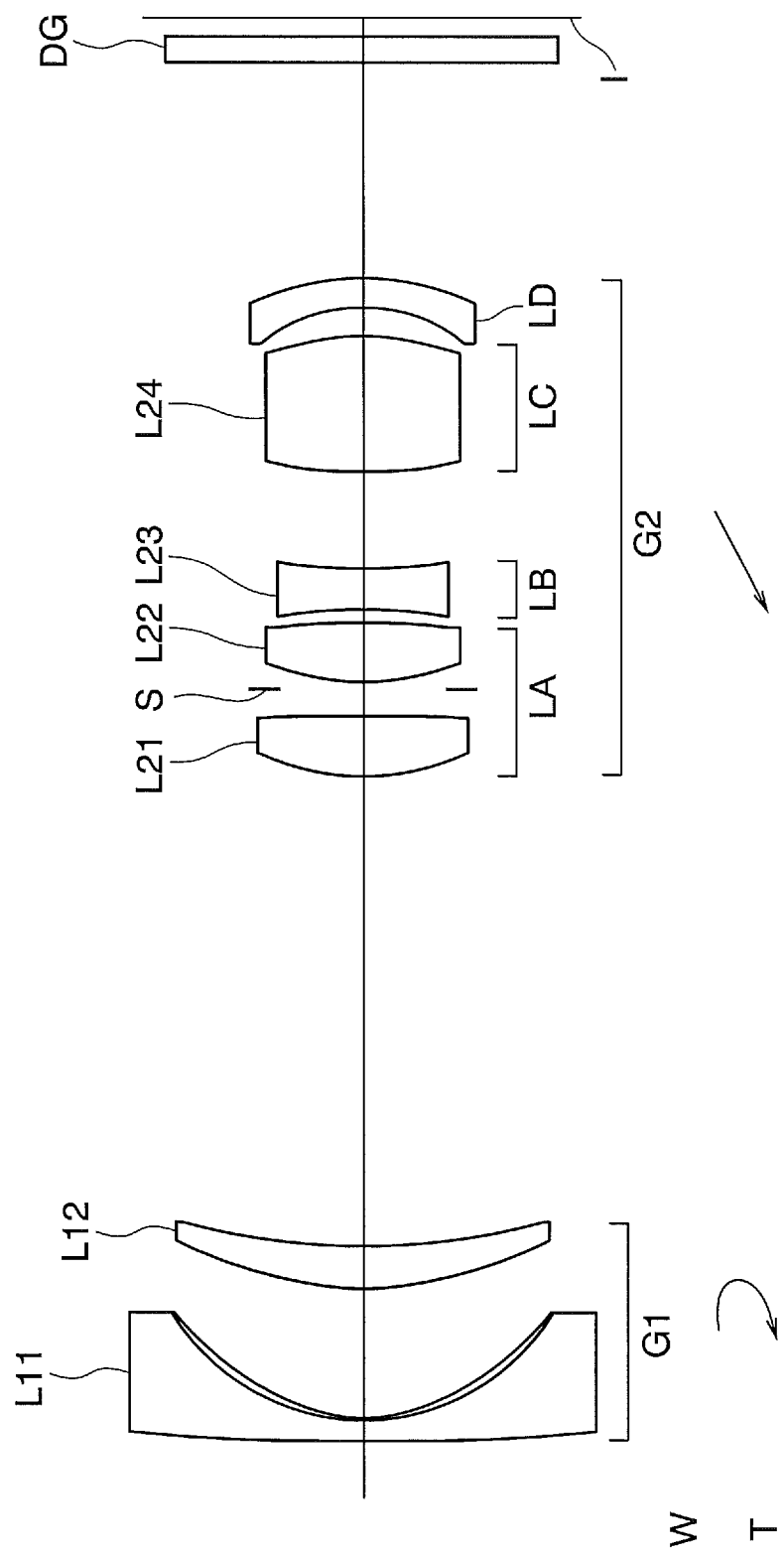
FIG. 11 is a sectional view showing a lens configuration of a zoom lens system according to Example 6 of the present application.

FIG. 11 is a sectional view showing a lens configuration of a zoom lens system and a zoom trajectory thereof according to Example 6 of the present application.

The zoom lens system according to Example 6 is composed of, in order from an object side, a front group G1 having negative refractive power, and a rear group G2 having positive refractive power.

The front group G1 is composed of, in order from the object side, a negative meniscus lens L11 having a convex surface facing the object side and a positive meniscus lens L12 having a convex surface facing the object side. The negative meniscus lens L11 is a socalled compound type aspherical lens which is composed of a glass substrate and a resin layer and whose aspherical surface is applied on the image plane side lens surface.

The rear group G2 is composed of, in order from the object side, a first partial group LA having positive refractive power, a second partial group LB having negative refractive power, a third partial group LC having positive refractive power and a negative meniscus lens LD having a convex surface facing the image side.

The first partial group LA is composed of, in order from the object side, a double convex positive lens L21, an aperture stop S, and a double convex positive lens L22.

The second partial group LB is composed of only a double concave negative lens L23.

The third partial group LC is composed of only a double convex positive lens L24.

In the present Example, a dummy glass DG that is equivalent to an optical low pass filter is disposed between the rear group G2 and the image plane I.

In the zoom lens system of Example 6, zooming from the wide angle end state to the telephoto end state is conducted by varying a distance between the front group G1 and the rear group G2.

Various values associated with the zoom lens system according to Example 6 are listed in Table 6 below.

TABLE 6

6
(Specifications)
Zoom Ratio: 2.89

| | W | | M | | T |
|---|---|---|---|---|---|
| f = | 18.50 | ~ | 28.00 | ~ | 53.40 |
| FNO = | 3.66 | ~ | 4.24 | ~ | 5.88 |
| ω = | 39.37 | ~ | 27.41 | ~ | 15.00° |
| Y = | 21.60 | ~ | 21.60 | ~ | 2.60 |
| TL = | 105.35 | ~ | 96.66 | ~ | 104.16 |
| Σd = | 103.98 | ~ | 95.28 | ~ | 102.78 |
| ACBF = | 18.70 | ~ | 27.60 | ~ | 51.41 |

(Surface Data)

| m | r | d | nd | νd | |
|---|---|---|---|---|---|
| OP | ∞ | | | | |
| 1) | 190.8993 | 1.6000 | 1.772500 | 49.61 | |
| 2) | 16.3000 | 0.1000 | 1.495210 | 56.34 | |
| *3) | 12.9064 | 9.7200 | 1.000000 | | |
| 4) | 28.6032 | 3.0000 | 1.846660 | 23.78 | |
| 5) | 52.4143 | d5 | 1.000000 | | |
| 6) | 19.0492 | 4.5000 | 1.497820 | 82.56 | |
| 7) | −104.7049 | 2.0000 | 1.000000 | | |
| 8) | ∞ | 0.5000 | 1.000000 | Aperture Stop S | |
| 9) | 19.5431 | 4.4000 | 1.497820 | 82.56 | |
| 10) | −60.6922 | 1.0000 | 1.000000 | | |
| 11) | −31.0276 | 2.9500 | 1.902650 | 35.71 | |
| 12) | 42.3391 | 7.1000 | 1.000000 | | |
| 13) | 31.5964 | 10.0000 | 1.516800 | 64.12 | |
| 14) | −22.6434 | 2.2000 | 1.000000 | | |
| 15) | −11.9054 | 2.0000 | 1.772500 | 49.61 | |
| 16) | −21.5934 | d16 | 1.000000 | | |
| 17) | ∞ | 2.0000 | 1.516800 | 64.12 | DG |
| 18) | ∞ | 1.3787 | 1.000000 | | |
| I | ∞ | | | | |

(Aspherical Surface Data)
Surface Number: 3

κ = 0.6529
A4 = −2.48779E−05
A6 = −2.67059E−07
A8 = 1.63755E−09
A10 = −8.33713E−12
A12 = 0.72191E−14

(Variable Distances)

| | W | M | T |
|---|---|---|---|
| d = | 18.50000 | 28.00000 | 53.40000 |
| d0 = | ∞ | ∞ | ∞ |
| d5 = | 34.90578 | 17.30401 | 0.99991 |
| d16 = | 16.00000 | 24.90402 | 48.71056 |

(Lens Group Data)

| Group | ST | f |
|---|---|---|
| G1 | 1 | −32.00000 |
| G2 | 6 | 29.99249 |

(Values for Conditional Expressions)

| | | |
|---|---|---|
| (1) | (r2 − r1)/(r2 + r1) = | 0.1484 |
| (2) | BFw/fw = | 1.011 |
| (3) | f2/fw = | 1.622 |
| (4) | (−fd)/f2 = | 1.258 |
| (5) | fc/f2 = | 0.908 |
| (6) | fa/f2 = | 0.577 |
| (7) | (−fb)/f2 = | 0.649 |

FIGS. 12A, 12B and 12C are graphs, respectively, showing various aberrations upon focusing on an infinitely distant object in the wide-angle end state, in an intermediate focal length state and in the telephoto end state of the zoom lens system according to Example 6 of the present application.

As is apparent from the respective graphs showing aberrations, the zoom lens system according to Example 6 shows superb optical performance as a result of good corrections to various aberrations including spherical aberration, curvature of field, astigmatism and coma.

According to the respective Examples above described, a small-sized zoom lens system in which angle of view (angle of coverage) 2ω in the wide angle end state is over 78°, an aperture is in the range of F3.5-F5.6, the number of lenses is small, and that can correct well various aberrations including spherical aberration, curvature of field, astigmatism, and coma and has a superb optical performance, can be realized.

It is noted here that the respective Examples as above described, are examples embodying the invention of the present application, but the invention of the present application should not be limited to those examples. The following contents may be adopted properly without deteriorating optical performances of the zoom lens system of the present application.

Although a zoom lens system with a two-lens-group configuration or a three-lens-group configuration is illustrated as Examples of the present application, the lens-group configuration according to the present application is not limited to these, and other lens-group configurations such as a four- or five-lens-group configuration is possible. More specifically, a lens or a lens group may be added to the most object side or most image side of the zoom lens system according to the present application. Incidentally, "a lens group" means at least one lens separated by air spaces.

In a zoom lens system according to the present application, in order to carry out focusing from an infinity object to a close object, a portion of a lens group, a lens group, or a plurality of lens groups may be moved along the optical axis as a focusing lens group. Such a focusing lens group is suitable for auto focusing, and is suitable for being driven by a motor for auto focusing such as an ultrasonic motor. In particular, it is preferable that, in the zoom lens system of the present application, at least a portion of the front group or of the rear group is used as a focusing lens group.

Further, in a zoom lens system according to the present application, a lens group or a portion of a lens group may be shifted in a direction including a component perpendicular to the optical axis as a vibration reduction lens group, or rotated (swayed) in a direction within a plane including the optical axis for correcting an image blur caused by a camera shake. In a zoom lens system according to the present application, it is particularly preferable that at least a portion of the rear group is used as a vibration reduction lens group.

Further, a lens surface of a lens composing a zoom lens system according to the present application may be a spherical surface, a plane surface, or an aspherical surface.

When a lens surface is a spherical surface or a plane surface, lens processing, assembling and adjustment become easy, and deterioration in optical performance caused by lens processing, assembling and adjustment errors can be prevented, so that it is preferable. Moreover, even if the image plane is deviated, deterioration in optical performance is little, so it is preferable.

When a lens surface is an aspherical surface, the aspherical surface may be fabricated by a grinding process, a glass molding process that a glass material is formed into an aspherical shape by a mold, or a compound type process that a resin material is formed into an aspherical shape on a glass lens surface. A lens surface may be a diffractive optical surface, and a lens may be a graded-index type lens (GRIN lens) or a plastic lens.

In a zoom lens system according to the present application, although an aperture stop is preferably provided inside or in the vicinity of the rear group, the function may be substituted by a lens frame without disposing a member as an aperture stop.

An antireflection coating having high transmittance over a broad wavelength range may be applied to each lens surface of a zoom lens system according to the present application to reduce flare or ghost images, so that high optical performance with high contrast can be attained.

In a zoom lens system according to the present application, a zoom ratio is about 2 to 5.

Next, a camera equipped with the zoom lens system according to the present application, is explained with reference to FIG. 13.

Figure 13:
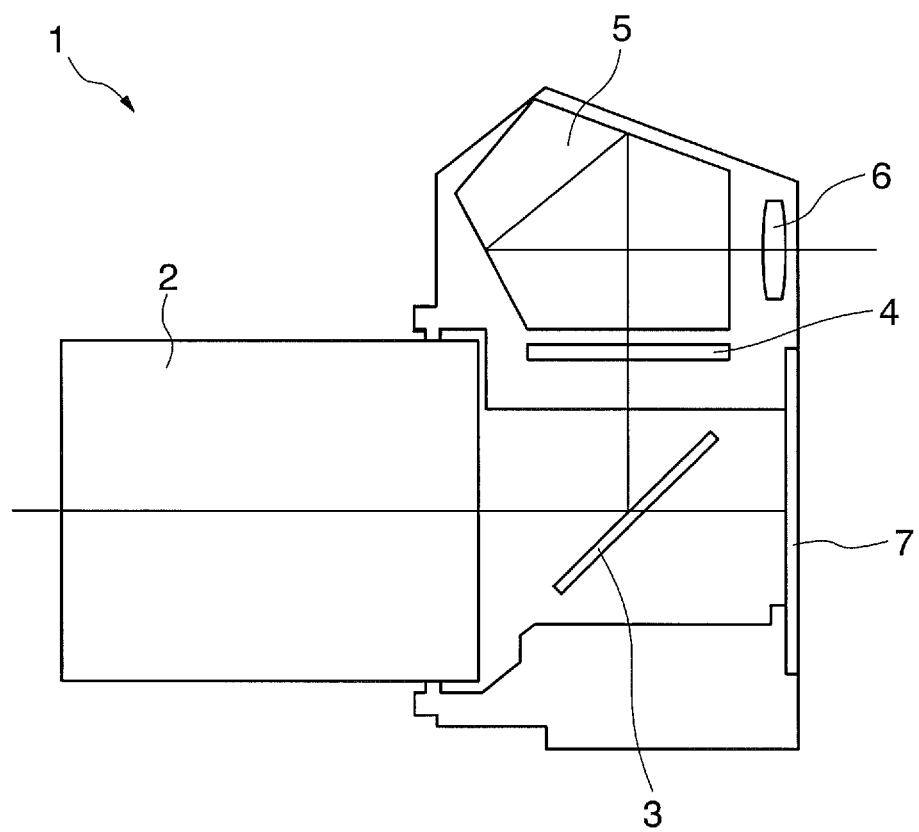
FIG. 13 is a diagram showing a construction of a camera equipped with the zoom lens system according to the present application.

FIG. 13 is a view showing a configuration of a camera equipped with the zoom lens system according to the present application.

The camera 1 is a single-lens reflex digital camera equipped with the zoom lens system according to the Example 1 as an imaging lens 2.

In the camera 1, light emitted from an unillustrated object (object to be photographed) is converged by the imaging lens 2, reflected by a quick return mirror 3, and focused on a focusing screen 4. The light focused on the focusing screen 4 is reflected a plurality of times in a pentagonal roof prism 5, and led to an eyepiece 6. Accordingly, a photographer can observe the object image as an erected image through the eyepiece 6.

When the photographer presses an unillustrated release button, the quick return mirror 3 is retracted out of the optical path, the light from the unillustrated object reaches on an imaging device 7. Accordingly, the light emitted from the object is captured by the imaging device 7, and stored in an unillustrated memory as a photographed image of the object. In this manner, the photographer can take a picture of an object by the camera 1.

The zoom lens system according to the present Example 1 installed as the imaging lens 2 into the camera 1, is compact in size and has small back focus and high optical performance because of its characteristic lens configuration. Therefore, the present camera 1 may realize excellent optical performance while downsizing the camera.

Incidentally, even if a zoom lens system according to Example 2 to Example 6 is installed in a camera, the same effect as the camera 1 can be obtained. Even if a zoom lens system according to any of Examples 1 to 6 is installed in a camera having a structure in which no quick return mirror is used, the same effect as the camera 1 can be obtained.

Finally, an outline of a method for manufacturing a zoom lens system according to the present application is described below with reference to FIG. 14.

Figure 14:
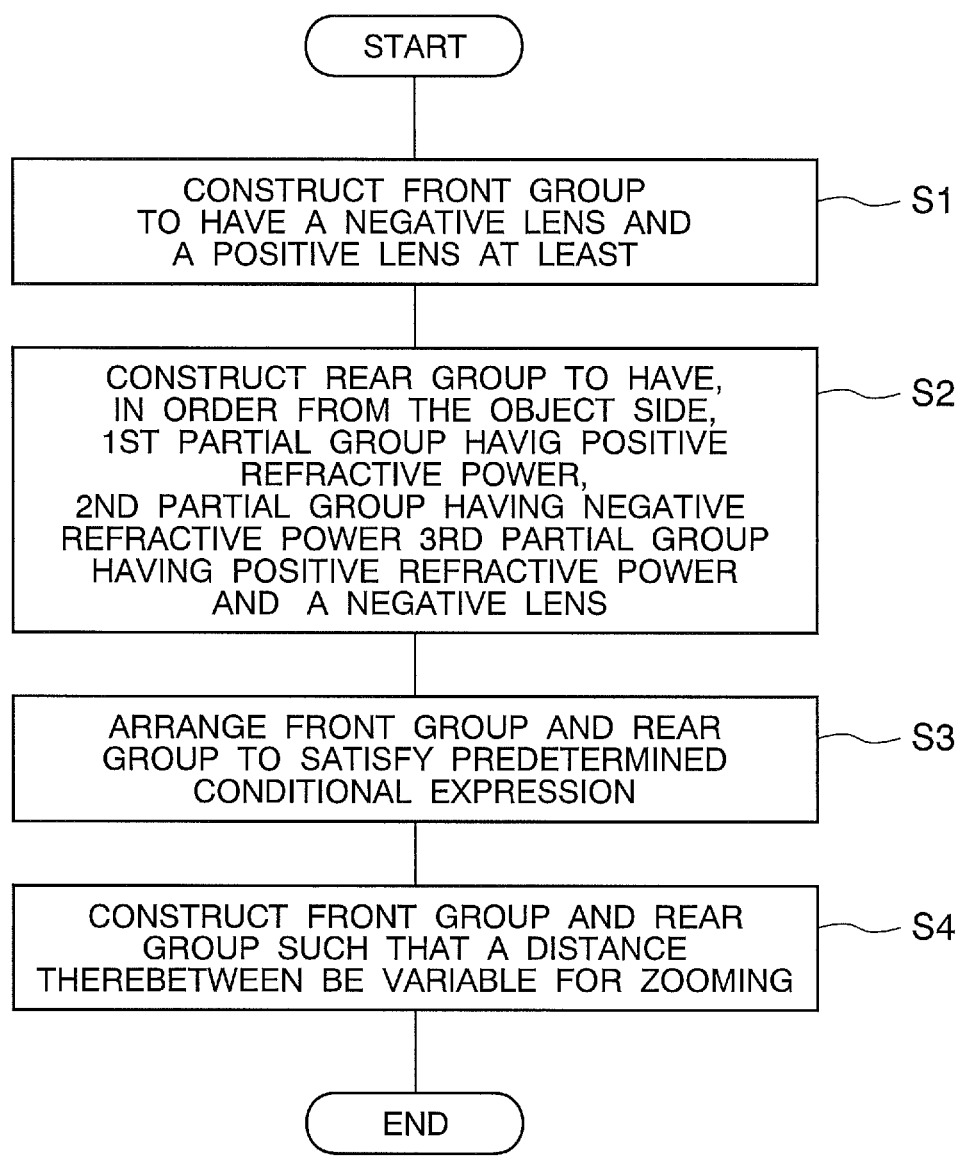
FIG. 14 is a flowchart showing a method for manufacturing the zoom lens system according to the present application.

FIG. 14 is a flowchart showing a method for manufacturing a zoom lens system according to the present application.

The method for manufacturing a zoom lens system according to the present application is a method for manufacturing a zoom lens system including, in order from an object side, a front group having negative refractive power and a rear group having positive refractive power, and the method includes the following steps of S1 to S4.

Step S1: constructing the front group to have, at least, a negative lens and a positive lens.

Step S2: constructing the rear group to have, in order from the object side, a first partial group having positive refractive power, a second partial group having negative refractive power, a third partial group having positive refractive power, and a negative lens.

Step S3: preparing the front group and the rear group for satisfying the following conditional expressions (1) to (3) and disposing them in a lens barrel:

$$0.00<(r2-r1)/(r2+r1)<1.00 \tag{1}$$

$$0.10<BFw/fw<2.00 \tag{2}$$

$$0.90<f2/fw<5.00 \tag{3}$$

where r1 denotes a curvature radius of an object side lens surface of the negative lens in the rear group,
r2 denotes a curvature radius of an image side lens surface of the negative lens in the rear group,
fw denotes a focal length of the entire zoom lens system upon focusing on an infinitely distant object in the wide-angle end state,
BFw denotes a back focus of the entire zoom lens system upon focusing on an infinitely distant object in the wide-angle end state, and
f2 denotes a focal length of the rear group.

Step S4: constructing the front group and the rear group such that a distance therebetween may be varied for zooming by providing a known moving mechanism.

The method for manufacturing a zoom lens system according to the present application makes it possible to manufacture a zoom lens system that is compact in size and has small back focus and excellent optical performance.

What is claimed is:

1. A zoom lens system comprising, in order from an object side:
   a front group having negative refractive power;
   a rear group having positive refractive power;
   zooming being carried out by varying a distance between said front group and said rear group,
   said front group including a negative lens and a positive lens at least,
   said rear group including, in order from the object side, a first partial group having positive refractive power, a second partial group having negative refractive power, a third partial group having positive refractive power, and a negative lens, and
   the following conditional expressions being satisfied:

$$0.00<(r2-r1)/(r2+r1)<0.28$$

$$0.10<BFw/fw<2.00$$

$$1.25<f2/fw<5.00$$

where r1 denotes a curvature radius of an object side lens surface of said negative lens in said rear lens group,
   r2 denotes a curvature radius of an image side lens surface of said negative lens in said rear lens group,
   fw denotes a focal length of the entire zoom lens system upon focusing on an infinitely distant object in the wide-angle end state,
   BFw denotes a back focus of the entire zoom lens system upon focusing on an infinitely distant object in the wide-angle end state, and
   f2 denotes a focal length of said rear group.

2. The zoom lens system according to claim 1, wherein said third partial group in said rear group consists of a positive lens or two lenses.

3. The zoom lens system according to claim 1, wherein said third partial group in said rear group consists of two lenses that are cemented together.

4. The zoom lens system according to claim 1, wherein said first partial group in said rear group consists of a positive lens or two positive lenses.

5. The zoom lens system according to claim 1, wherein said second partial group in said rear group consists of a negative lens or two lenses.

6. The zoom lens system according to claim 1, wherein said negative lens in said rear group includes a meniscus lens having a convex surface facing the image side.

7. The zoom lens system according to claim 1, wherein the following conditional expression is satisfied:

$$0.10<(-fd)/f2<6.00$$

where fd denotes a focal length of said negative lens in said rear group.

8. The zoom lens system according to claim 1, wherein the following conditional expression is satisfied:

$$0.10<fc/f2<3.00$$

where fc denotes a focal length of the third partial group in said rear group.

9. The zoom lens system according to claim 1, wherein the following conditional expression is satisfied:

$$0.01<fa/f2<3.00$$

where fa denotes a focal length of the first partial group in said rear group.

10. The zoom lens system according to claim 1, wherein the following conditional expression is satisfied:

$$0.10<(-fb)/f2<4.00$$

where fb denotes a focal length of the second partial group in said rear group.

11. The zoom lens system according to claim 1, wherein an aperture stop is disposed between said first partial group and said second partial group.

12. An imaging apparatus equipped with the zoom lens system according to claim 1.

13. A method for manufacturing a zoom lens system including, in order from an object side, a front group having negative refractive power and a rear group having positive refractive power, the method including the steps of:
    constructing the front group to have, at least, a negative lens and a positive lens;
    constructing the rear group to have, in order from the object side, a first partial group having positive refractive power, a second partial group having negative refractive power, a third partial group having positive refractive power and a negative lens;
    arranging said front group and said rear group such that the following conditional expressions are satisfied:

$$0.00<(r2-r1)/(r2+r1)<0.28$$

$$0.10<BFw/fw<2.00$$

$$1.25<f2/fw<5.00$$

where r1 denotes a curvature radius of an object side lens surface of said negative lens in said rear group,
    r2 denotes a curvature radius of an image side lens surface of said negative lens in said rear group,
    fw denotes a focal length of said entire zoom lens system upon focusing on an infinitely distant object in the wide-angle end state, and
    BFw denotes a back focus of said entire zoom lens system upon focusing on an infinitely distant object in the wide-angle end state, and f2 denotes a focal length of said rear group; and arranging said front group and said rear group such that a distance therebetween is varied for zooming.

14. The method for manufacturing a zoom lens system according to claim 13, wherein said third partial group in said rear group consists of a positive lens or two lenses.

15. The method for manufacturing a zoom lens system according to claim 13, wherein said first partial group in said rear group consists of a positive lens or two positive lenses.

16. The method for manufacturing a zoom lens system according to claim 13, wherein said second partial group in said rear group consists of a negative lens or two lenses.

17. The method for manufacturing a zoom lens system according to claim 13, wherein said negative lens in said rear group includes a meniscus lens having a convex surface facing the image side.

18. A zoom lens system comprising, in order from an object side:
- a front group having negative refractive power;
- a rear group having positive refractive power;
- zooming being carried out by varying a distance between said front group and said rear group,
- said front group including a negative lens and a positive lens at least,
- said rear group including, in order from the object side, a first partial group having positive refractive power, a second partial group having negative refractive power, a third partial group having positive refractive power, and a negative lens, and
- the following conditional expressions being satisfied:

$$0.00<(r2-r1)/(r2+r1)<1.00$$

$$0.10<BFw/fw<2.00$$

$$1.609 \leq f2/fw<5.00$$

where r1 denotes a curvature radius of an object side lens surface of said negative lens in said rear lens group,
r2 denotes a curvature radius of an image side lens surface of said negative lens in said rear lens group,
fw denotes a focal length of the entire zoom lens system upon focusing on an infinitely distant object in the wide-angle end state,
BFw denotes a back focus of the entire zoom lens system upon focusing on an infinitely distant object in the wide-angle end state, and
f2 denotes a focal length of said rear group.

19. A zoom lens system comprising, in order from an object side:
- a front group having negative refractive power;
- a rear group having positive refractive power;
- zooming being carried out by varying a distance between said front group and said rear group,
- said front group including a negative lens and a positive lens at least,
- said rear group including, in order from the object side, a first partial group having positive refractive power, a second partial group having negative refractive power, a third partial group having positive refractive power, and a negative lens, and
- the following conditional expressions being satisfied:

$$0.00<(r2-r1)/(r2+r1)<1.00$$

$$0.10<BFw/fw<2.00$$

$$1.25<f2/fw<5.00$$

$$0.50<(-fb)/f2<4.00$$

where r1 denotes a curvature radius of an object side lens surface of said negative lens in said rear lens group,
r2 denotes a curvature radius of an image side lens surface of said negative lens in said rear lens group,
fw denotes a focal length of the entire zoom lens system upon focusing on an infinitely distant object in the wide-angle end state,
BFw denotes a back focus of the entire zoom lens system upon focusing on an infinitely distant object in the wide-angle end state,
f2 denotes a focal length of said rear group, and
fb denotes a focal length of the second partial group in said rear group.

20. A zoom lens system comprising, in order from an object side:
- a front group having negative refractive power;
- a rear group having positive refractive power;
- zooming being carried out by varying a distance between said front group and said rear group,
- said front group including a negative lens and a positive lens at least,
- said rear group including, in order from the object side, a first partial group having positive refractive power, a second partial group having negative refractive power, a third partial group having positive refractive power, and a negative lens, and
- the following conditional expressions being satisfied:

$$0.00<(r2-r1)/(r2+r1)<1.00$$

$$0.10<BFw/fw<2.00$$

$$1.25<f2/fw<5.00$$

$$0.60<fc/f2<3.00$$

where r1 denotes a curvature radius of an object side lens surface of said negative lens in said rear lens group,
r2 denotes a curvature radius of an image side lens surface of said negative lens in said rear lens group,
fw denotes a focal length of the entire zoom lens system upon focusing on an infinitely distant object in the wide-angle end state,
BFw denotes a back focus of the entire zoom lens system upon focusing on an infinitely distant object in the wide-angle end state,
f2 denotes a focal length of said rear group, and
fc denotes a focal length of the third partial group in said rear group.

21. A method for manufacturing a zoom lens system including, in order from an object side, a front group having negative refractive power and a rear group having positive refractive power, the method including the steps of:
- constructing the front group to have, at least, a negative lens and a positive lens;
- constructing the rear group to have, in order from the object side, a first partial group having positive refractive power, a second partial group having negative refractive power, a third partial group having positive refractive power and a negative lens;
- arranging said front group and said rear group such that the following conditional expressions are satisfied:

$$0.00<(r2-r1)/(r2+r1)<1.00$$

$$0.10<BFw/fw<2.00$$

$$1.609 \leq f2/fw<5.00$$

where r1 denotes a curvature radius of an object side lens surface of said negative lens in said rear group, r2 denotes a curvature radius of an image side lens surface of said negative lens in said rear group, fw denotes a focal length of said entire zoom lens system upon focusing on an infinitely distant object in the wide-angle end state, BFw denotes a back focus of said entire zoom lens system upon focusing on an infinitely distant object in the wide-angle end state, and f2 denotes a focal length of said rear group; and arranging said front group and said rear group such that a distance therebetween is varied for zooming.

22. A method for manufacturing a zoom lens system including, in order from an object side, a front group having negative refractive power and a rear group having positive refractive power, the method including the steps of:

constructing the front group to have, at least, a negative lens and a positive lens;

constructing the rear group to have, in order from the object side, a first partial group having positive refractive power, a second partial group having negative refractive power, a third partial group having positive refractive power and a negative lens;

arranging said front group and said rear group such that the following conditional expressions are satisfied:

$$0.00 < (r2-r1)/(r2+r1) < 1.00$$

$$0.10 < BFw/fw < 2.00$$

$$1.25 < f2/fw < 5.00$$

$$0.50 < (-fb)/f2 < 4.00$$

where r1 denotes a curvature radius of an object side lens surface of said negative lens in said rear group, r2 denotes a curvature radius of an image side lens surface of said negative lens in said rear group, fw denotes a focal length of said entire zoom lens system upon focusing on an infinitely distant object in the wide-angle end state, BFw denotes a back focus of said entire zoom lens system upon focusing on an infinitely distant object in the wide-angle end state, f2 denotes a focal length of said rear group, and fb denotes a focal length of the second partial group in said rear group; and arranging said front group and said rear group such that a distance therebetween is varied for zooming.

23. A method for manufacturing a zoom lens system including, in order from an object side, a front group having negative refractive power and a rear group having positive refractive power, the method including the steps of:

constructing the front group to have, at least, a negative lens and a positive lens;

constructing the rear group to have, in order from the object side, a first partial group having positive refractive power, a second partial group having negative refractive power, a third partial group having positive refractive power and a negative lens;

arranging said front group and said rear group such that the following conditional expressions are satisfied:

$$0.00 < (r2-r1)/(r2+r1) < 1.00$$

$$0.10 < BFw/fw < 2.00$$

$$1.25 < f2/fw < 5.00$$

$$0.60 < fc/f2 < 3.00$$

where r1 denotes a curvature radius of an object side lens surface of said negative lens in said rear group, r2 denotes a curvature radius of an image side lens surface of said negative lens in said rear group, fw denotes a focal length of said entire zoom lens system upon focusing on an infinitely distant object in the wide-angle end state, BFw denotes a back focus of said entire zoom lens system upon focusing on an infinitely distant object in the wide-angle end state, f2 denotes a focal length of said rear group, and fc denotes a focal length of the third partial group in said rear group; and arranging said front group and said rear group such that a distance therebetween is varied for zooming.

* * * * *